United States Patent
Yoshikawa et al.

(10) Patent No.: US 9,126,198 B2
(45) Date of Patent: Sep. 8, 2015

(54) TRANSPORTATION OF MICROMETER-SIZED OBJECT AND EXTRACTION OF MECHANICAL WORK BY CONSTANT ELECTRIC FIELD

(75) Inventors: Kenichi Yoshikawa, Kyoto (JP); Masahiro Takinoue, Kanagawa (JP); Yu Atsumi, Kyoto (JP)

(73) Assignee: Japan Science and Technology Agency, Saitama (JP)

( * ) Notice: Subject to any disclaimer, the term of this patent is extended or adjusted under 35 U.S.C. 154(b) by 554 days.

(21) Appl. No.: 13/202,320

(22) PCT Filed: Feb. 19, 2010

(86) PCT No.: PCT/JP2010/052566
§ 371 (c)(1),
(2), (4) Date: Sep. 22, 2011

(87) PCT Pub. No.: WO2010/095724
PCT Pub. Date: Aug. 26, 2010

(65) Prior Publication Data
US 2012/0001517 A1 Jan. 5, 2012

(30) Foreign Application Priority Data

Feb. 20, 2009 (JP) .................. 2009-038446

(51) Int. Cl.
*H02N 1/10* (2006.01)
*B01L 3/00* (2006.01)
*H02N 1/00* (2006.01)

(52) U.S. Cl.
CPC ....... *B01L 3/50273* (2013.01); *B01L 3/502792* (2013.01); *B01L 2300/088* (2013.01);
(Continued)

(58) Field of Classification Search
CPC ......... H02N 1/00; H02N 1/002; H02N 1/004; H02N 1/10; B01L 2400/0415; B01L 2400/0421; B01L 2400/0424
USPC ......... 310/300, 308, 309, 12.03, 11; 204/600, 204/547, 569, 643; 200/182
IPC ....................................................... H02N 1/10
See application file for complete search history.

(56) References Cited

U.S. PATENT DOCUMENTS 3,167,666 A * 1/1965 Janner et al. .................. 310/309
3,355,605 A * 11/1967 Okress ............................ 310/11
(Continued)

FOREIGN PATENT DOCUMENTS

| EP | 1 764 418 A1 | 3/2007 |
|---|---|---|
| JP | 2000-271475 A | 3/2000 |

(Continued)

OTHER PUBLICATIONS

Masahiko Hase, Shun N. Watanabe and Kenichi Yoshikawa, A journal "Physical Review" E 74, 046301, 2006.*
(Continued)

*Primary Examiner* — John K Kim
(74) *Attorney, Agent, or Firm* — Seed IP Law Group PLLC

(57) ABSTRACT

A technique capable of making an object move and transporting it without generation of a current, and extracting mechanical work. As a result of diligent effort, the present inventors have found that by arranging two electrodes for generating an electric field for a dielectric body of a micrometer-size or the like in an insulating fluid such as oil, such that the central axes of the two electrodes are not aligned, and applying an electric field (for example, constant electric field), the dielectric body can be transported three-dimensionally at will, and as a result, mechanical work can be extracted.

20 Claims, 11 Drawing Sheets

(52) U.S. Cl.
CPC .... *B01L2300/089* (2013.01); *B01L 2300/0861* (2013.01); *B01L 2400/0415* (2013.01); *B01L 2400/0424* (2013.01); *H02N 1/002* (2013.01); *H02N 1/004* (2013.01); *H02N 1/10* (2013.01)

(56) References Cited

U.S. PATENT DOCUMENTS

| | | | |
|---|---|---|---|
| 5,262,695 A * | 11/1993 | Kuwano et al. | 310/309 |
| 6,294,063 B1 * | 9/2001 | Becker et al. | 204/450 |
| 6,392,313 B1 * | 5/2002 | Epstein et al. | 290/52 |
| 6,903,487 B2 * | 6/2005 | Shreeve et al. | 310/309 |
| 6,977,033 B2 * | 12/2005 | Becker et al. | 204/450 |
| 7,147,763 B2 * | 12/2006 | Elrod et al. | 204/547 |
| 7,446,450 B2 * | 11/2008 | Boland et al. | 310/309 |
| 7,615,762 B2 * | 11/2009 | Satyanarayana et al. | 250/461.2 |
| 2003/0122446 A1 * | 7/2003 | Chen | 310/309 |
| 2004/0055536 A1 * | 3/2004 | Kolar et al. | 118/626 |
| 2004/0160143 A1 * | 8/2004 | Shreeve et al. | 310/309 |
| 2008/0047833 A1 * | 2/2008 | Hirahara et al. | 204/450 |
| 2008/0100175 A1 * | 5/2008 | Clark | 310/309 |
| 2008/0264506 A1 * | 10/2008 | Beerling et al. | 137/831 |
| 2009/0065714 A1 * | 3/2009 | Keady | 250/503.1 |
| 2009/0203063 A1 * | 8/2009 | Wheeler et al. | 435/29 |
| 2009/0294290 A1 * | 12/2009 | Furusawa et al. | 204/547 |
| 2012/0001517 A1 * | 1/2012 | Yoshikawa et al. | 310/309 |

FOREIGN PATENT DOCUMENTS

| | | |
|---|---|---|
| JP | 2008-3074 A | 1/2008 |
| WO | 0047322 A2 | 8/2000 |
| WO | 2006087890 A1 | 8/2006 |

OTHER PUBLICATIONS

Wang et al, "On-demand droplet release for droplet-based microfluidic system", Lab Chip, Journal "The Royal Society of Chemistry", 2010.*

Fan et al, "General digital microfluidic platform manipulating dielectric and conductive droplets by dielectrophoresis and electrowetting", Lab on Chip, Journal of the Royal Society of Chemistry, 2009.*

Krause, S., "Electrorotation of Deformable Fluid Droplets", J. Colloid Interface Sci (1998), vol. 206, No. 1, pp. 10-18.

Bailes, P.J., "An Experimental Investigation Into the Motion of a Single Drop in a Pulsed DC Electric Field", Chem. Eng. Res. Des., Apr., 2000, vol. 78, No. A3, pp. 499-505.

Du, F., "Insulator-Based Dielectrophoresis in Viscous Media-Simulation of Particle and Droplet Velocity", J. Electrost. (2007, vol. 65, No. 7, pp. 452-458.

Chinese Office Action dated Jul. 22, 2013, for corresponding CN Application No. 201080016544.7, 13 pages.

Behkam et al., "Bacterial flagella-based propulsion and on/off motion control of microscale objects," *Applied Physics Letters* 90:023902-1 to 023902-3, 2007.

Eow et al., "Experimental studies of deformation and break-up of aqueous drops in high electric fields," *Colloids and Surfaces A: Physicochem, Eng. Aspects* 225:193-210, 2003.

Grier, David G., "A revolution in optical manipulation," *Nature* 424:810-816, Aug. 14, 2003.

Hase et al., "Rhythmic motion of a droplet under a dc electric field," *Physical Review E* 74:046301-1 to 046301-4, 2006.

Hiratsuka et al., "A microrotary motor powered by bacteria," *PNAS* 103(37):13618-13623, Sep. 12, 2006.

Hiyama et al., "Biomolecular-Motor-Based Nano- or Microscale Particle Translocations on DNA Microarrays," *NANO Letters* 9(6):2407-2413, 2009.

Jones, "Electromechanics of Particles," Cambridge University Press, pp. 74-77, 1995 (3 pages).

Jung et al., "Electrical charging of a conducting water droplet in a dielectric fluid on the electrode surface," *Journal of Colloid and Interface Science* 322:617-623, 2008.

Link et al., "Electric Control of Droplets in Microfluidic Devices," *Angew. Chem. Int. Ed.* 45:2556-2560, 2006.

Mochizuki et al., "Bouncing Motions of Liquid Drops between Tilted Parallel-Plate Electrodes," *AIChE Journal* 36(7):1039-1045, Jul. 1990.

Purcell, E.M., "Life at low Reynolds number," *American Journal of Physics* 45(1):3-11, Jan. 1977.

Ristenpart et al., "Non-coalescence of oppositely charged drops," *Nature* 461:377-380, Sep. 17, 2009.

Tabeling, Patrick, "Dielectrophoresis," *Introduction to Microfluidics*, Oxford University Press, pp. 211-214, 2006 (5 pages).

Teh et al., "Droplet microfluidics," *Lab Chip* 8:198-220, 2008.

Van Den Heuvel et al., "Motor Proteins at Work for Nanotechnology," *Science* 317:333-336, Jul. 20, 2007.

Voldman, Joel, "Electrical Forces for Microscale Cell Manipulation," *Annu. Rev. Biomed. Eng.* 8:425-454, 2006.

Japanese Office Action with partial English Translation, dated Feb. 10, 2015, for corresponding Japanese Application No. 2011-500666, 4 pages.

* cited by examiner (a)

(b)

(a)

(b)

(a)

(b)

TRANSPORTATION OF MICROMETER-SIZED OBJECT AND EXTRACTION OF MECHANICAL WORK BY CONSTANT ELECTRIC FIELD

CROSS-REFERENCE TO RELATED APPLICATION

The present application claims the priority of Japanese Patent Application No. 2009-038446 filed on Feb. 20, 2009. The content of Japanese Patent Application 2009-038446 is hereby incorporated by reference in the present specification in its entirety. All literature, whether patent or non-patent literature, cited herein is incorporated by reference in its entirety.

BACKGROUND

1. Technical Field

The present invention relates to transportation of a micrometer-sized object and extraction of mechanical work by a constant electric field.

2. Description of the Related Art

Conventionally, an alternating current electric field is used for oscillatory and periodic motion. In this case, motion occurs as a result of generation of a current.

In micrometer-sizes, since the Reynolds number representing a ratio of magnitude between inertial force and viscous force of a flow is low, it is considered to be difficult to extract work from mechanical motion.

Masahiko Hase, Shun N. Watanabe, and Kenichi Yoshikawa, PHYSICAL REVIEW E 74, 046301 2006 describes the effect of a constant electric field on a water droplet having a diameter of several tens μm in oil.

The micrometer-sized world which is a subject of the present invention is generally called the world of low Reynolds number. In the world of such a scale, it is known that work is not extracted only by making periodic motion on the straight line not having directionality. Therefore, it is impossible to extract work only by linear reciprocal motion as described in Non-Patent Document 1.

In light of this, it has been demanded to provide a technique capable of making an object move autonomously at will even in a constant electric field, transporting the same, and extracting mechanical work in micrometer-sizes.

Also, T. Mochizuki, Y. Mori, and N. Kaji, AIChE Journal 36, 1039 (1990); J. Eow, M. Ghadiri, and A. Sharif, Colloids Surf. A 225,193 (2003); Y. Jung, H. Oh, and I. Kang, J. Colloid Interface Sci. 322, 617 (2008); and W. D. Ristenpart, J. C. Bird, A. Belmonte, F. Dollar, and H. A. Stone, Nature 461, 377 (2009) are known. While these documents describe making a micro-object linearly move, they fail to make two-dimensional motion that is the most important for extracting work and lack any description of such idea.

In nanometer to micrometer scales, the Reynolds numbers are very low, and inertial force of an object does not play an important role, and motion of the object is rapidly attenuated by viscous force of the environment. Therefore, some driving energy should be supplied for continuously propelling the object. As described above, motion of a micro-object proposes a critical issue in a nonlinear system and a non-equilibrium system. In addition, the capability of propelling and controlling micro-objects such as biological polymers and cells is important in researches of applied physics and biological physics, as well as in MEMS and μTAS techniques, and plenty of appropriate techniques have been actively developed, however, they are far from practical use.

Prior Art Documents, Non-Patent Documents

Non-Patent Document 1: Masahiko Hase, Shun N. Watanabe, and Kenichi Yoshikawa, PHYSICAL REVIEW E 74, 046301 2006.

Non-Patent Document 2: T. Mochizuki, Y. Mori, and N. Kaji, AIChE Journal 36, 1039 (1990).

Non-Patent Document 3: J. Eow, M. Ghadiri, and A. Sharif, Colloids Surf. A 225,193 (2003).

Non-Patent Document 4: Y. Jung, H. Oh, and I. Kang, J. Colloid Interface Sci. 322, 617 (2008).

Non-Patent Document 5: W. D. Ristenpart, J. C. Bird, A. Belmonte, F. Dollar, and H. A. Stone, Nature 461, 377 (2009).

BRIEF SUMMARY OF THE INVENTION

Problems to be Solved by the Invention

It is an object of the present invention to provide a technique capable of making an object move even in a constant electric filed at will without generation of a current, transporting the same, and extracting mechanical work in micrometer-sized space.

Means for Solving the Problems

As a result of diligent efforts, the present inventors have found that by arranging two electrodes for generating an electric field for a dielectric body of a micrometer-size (in the present specification, typically refers to the range of several nm to 1000 μm) or the like in an insulating fluid such as oil, such that the central axes of the two electrodes are not aligned, and applying an electric field (for example, constant electric field), the dielectric body can be transported three-dimensionally at will, and as a result, mechanical work can be extracted (FIG. 1). In the present invention, the dielectric body is an arbitrary dielectric object such as a water droplet, a polystyrene bead, a glass bead or the like. The micrometer-sized object can be an acceptable substance that is a dielectric body. It has also revealed that the ambient medium may be any insulating fluid without being limited to oil. Also, the present invention has solved the problems that are not even recognized in Non-Patent Documents 1 to 5. Therefore, it can be said that the present invention has made great progress in that it has made the world's first success in practicing rotational motion which is one of the most important two-dimensional motion in extracting work. Additionally, since the aforementioned Non-Patent Documents 1 to 5 completely lack the viewpoint of extracting work, the present invention is not easily conceivable from these documents. In other words, descriptions of these documents have been made merely in the point of "move." The point "extraction of work" which is the feature of the present invention has not been even suggested. No report has been found about high-dimensional cyclic motion in a constant electric field. In order to extract work and energy from motion of a micrometer-size, at least two-dimensional cyclic motion is required. Rotational motion of a micro-object of a dielectric body reported in the present invention is possibly useful in developing simple and useful strategy for controlling a micro-object.

That is, significance of the present invention lies in success in realizing very important cyclic motion in addition to simply making a liquid droplet move, and it has been also demonstrated that work can be extracted by using the cyclic motion as in the preset invention.

The present invention relates to the rotational motion of a water micro-droplet in an oil phase in a steady direct-current electric field. A liquid droplet makes rotational motion under an appropriate geometrical arrangement of a positive electrode and a negative electrode. In the present invention, the rotational motion occurs at a potential exceeding a specific critical potential, and frequency thereof increases as the potential increases. The present invention provides a simple theoretical model describing the occurrence of rotational motion, and an application example of a system of the present invention for realizing a micro rotary motor.

Therefore, the present invention provides the following:

(1) A method of transporting a dielectric body or extracting mechanical work, including:
A) arranging two electrodes for generating an electric field so that the central axes of the two electrodes are not aligned, and B) applying an electric field to the dielectric body in an insulating fluid.

(2) The method as described in the above item, wherein said dielectric body is of a micrometer-size, and the micrometer-size ranges from several nm to 1000 μm.

(3) The method as described in the above item, wherein said micrometer-size ranges from 1 μm to 100 μm.

(4) The method as described in the above item, wherein said dielectric body refers to a substance generating dielectric polarization but not generating a current when an electrostatic field is applied, and is a substance having electrostatic chargeability.

(5) The method as described in the above item, wherein said dielectric body is selected from the group consisting of a water droplet; a polymeric substance such as a polystyrene bead, polydimethylsiloxane (PDMS) or a polyacrylamide gel; and a glass bead.

(6) The method as described in the above item, wherein said water droplet is generated by using a surfactant.

(7) The method as described in the above item, wherein said surfactant is generated by using dioleoyl phosphatidylcholine (DOPC), dioleoyl phosphatidylethanolamine (DOPE), dioleoyl phosphatidylserine (DOPS), eggPC, stearyl trimethyl ammonium chloride (STAC), stearyl trimethyl ammonium bromide (STAB), sodium dodecyl sulfate (SDS), dodecyl trimethyl ammonium chloride, pentaethylene glycol dodecyl ether, and the like. Here, the surfactant is a substance having a hydrophilic group and a hydrophobic group in one molecule, and capable of forming a water droplet in a hydrophobic oil liquid, and it is present at the interface between oil and water.

(8) The method as described in the above item, wherein said insulating fluid is a substance that is non-volatile, non-conductive, and fluent under normal temperature and normal pressure, and has a specific gravity with respect to said micrometer-sized dielectric body of within ±50%.

(9) The method as described in the above item, wherein said insulating fluid is selected from the group consisting of mineral oil, liquid paraffin, alkane and silicone oil.

(10) The method as described in the above item, wherein said electric field is a constant electric field.

(11) The method as described in the above item, wherein said electric field is subject to the range from 1 V to 1000 V.

(12) The method as described in the above item, wherein a positive electrode and a negative electrode for generating said electric field are arranged so that their central axes are not parallel with each other. Cyclic motion is difficult to extract in the form where the central axes of the electrodes are aligned, the asymmetrical arrangement is very beneficial. Further, by arranging unparallel, cyclic motion can be extracted much more than in the parallel arrangement.

(13) The method as described in the above item, wherein said electrode has a pyramid or conical shape having a sharp tip, or a prismatic or cylindrical shape, and has a material having conductivity.

(14) The method as described in the above item, wherein said electrode is a conductive substance such as tungsten, tungsten carbide, gold, platinum, silver, copper, iron and aluminum.

(15) The method as described in the above item, wherein said electric field is generated by a set of at least two electrodes of a positive electrode and a negative electrode, and an orientation of the set of at least two electrodes is such that at least two are in different directions to each other, the method further including the step of changing the route or mode of motion by controlling said electric field and a spatial arrangement of electrodes for generating the electric field.

(16) The method as described in the above item, wherein said control is realized by shifting an electrode to a desired position by manipulating each coordinate using a micromanipulator capable of manipulating each of three-dimensional coordinates by 1 μm, or by a manipulation with a hand or tweezers.

(17) The method as described in the above item, further including the step of transporting said dielectric body by indirectly controlling the dielectric body by spatial control of said electrodes and control of intensity of an applied voltage.

(18) The method as described in the above item, wherein a micro-turbine is disposed in a space where said dielectric body is movable, and work is extracted from the micro-turbine that moves by motion of the dielectric body, and the micro-turbine has a rotation axis and a part of a blade which is rotatable about the rotation axis. Here, the micro-turbine is an object of 1 μm to 100 μm in size that can be fabricated by a micro-fabrication technique, including a rotation axis and a part of a blade which is rotatable about the rotation axis. For example, such includes a water wheel by a $SiO_2$ layer processed into a micrometer-size (for example, those used in Y. Hiratsuka, M. Miyata, T. Tada, T. Q. Uyeda, Proc. Natl Acad. Sci. USA 103, 13618-13623 (2006) and the like).

(19) The method as described in the above item, wherein there are a plurality of said dielectric bodies, and the plurality of dielectric bodies are caused to collectively move to function as a motor.

(20) As to mechanically control a polymer, liquid droplet transportation of a pharmaceutical, a chemical reaction, pharmaceutical preparation, non-contact transportation of a biological sample, and a micro-channel, the following descriptions are given.

Mechanical control of a polymer: The technique of binding both ends of a polymer such as DNA to separate polymer beads is established. Since the polymer beads coupled to both ends of a polymer can be controlled at will by using the achievement of the present study, the polymer can be mechanically controlled as a result.

Liquid droplet transportation of a pharmaceutical: Since a water droplet can be created as described above, transportation can be easily executed by putting a pharmaceutical into the water droplet.

Chemical reaction: By bringing liquid droplets under transportation into collision with each other to fuse the same, a chemical reaction can be started in the liquid droplet.

Pharmaceutical preparation: Similarly to the chemical reaction, by bringing liquid droplets under transportation into collision with each other to fuse the same, mixing and the like may be executed. Those not desired to be mixed may be prepared in separate liquid droplets before starting the reaction, and they may be mixed in the site where they are intended to be mixed. Additionally, this is achievable in a very small space at micrometer-sized level.

Non-contact transportation of biological sample: The present technique is also applicable to a cell or a biological polymer which is a kind of a dielectric body.

Combination with micro-channel: Similarly to the aforementioned micro-turbine. It is a part of micro-techniques.

Combination with a semiconductor technique means conducting control of an electric field by using a semiconductor device and a circuit substrate, rather than directly controlling the motion.

The present invention also provides the following inventions relating to an apparatus.

(21) An apparatus of transporting a dielectric body including:
A) an insulating fluid for receiving the dielectric body; and
B) a means for applying an electric field including two electrodes, residing in the insulating fluid, the two electrodes being arranged so that their central axes are not aligned.

Here, the means for applying an electric field may be any device as far as it has electrodes arranged in an insulating fluid and applies a voltage.

(22) An apparatus for extracting mechanical work, including:
A) an insulating fluid;
B) a dielectric body arranged in the insulating fluid;
C) a means for applying an electric field including two electrodes, residing in the insulating fluid, the two electrodes being arranged so that their central axes are not aligned; and
D) a means for extracting mechanical work from the dielectric body.

As a means for extracting mechanical work from the dielectric body or a means for converting the motion of the dielectric body into work, a propeller-like substance having a size of about 1 μm to several thousand μm may be rotated; likewise a water wheel to extract work as a turbine, or a magnetized substance may be adhered to the dielectric body to indirectly control the electric field, and work may be extracted by disposing a turbine in the neighborhood.

In further embodiments, the present invention also provides the following inventions relating to an apparatus.

(23) The apparatus as described in the above item, wherein said dielectric body is of a micrometer-size, and the micrometer-size ranges from several nm to 1000 μm.

(24) The apparatus as described in the above item, wherein said micrometer-size ranges from 1 μm to 100 μm.

(25) The apparatus as described in the above item, wherein said dielectric body refers to a substance generating dielectric polarization but not generating a current when an electrostatic field is applied, and is a substance having electrostatic chargeability.

(26) The apparatus as described in the above item, wherein said dielectric body is a water droplet; a polymeric substance such as a polystyrene bead, polydimethylsiloxane (PDMS) or a polyacrylamide gel; a glass bead or the like.

(27) The apparatus as described in the above item, wherein said water droplet is generated by using a surfactant.

(28) The apparatus as described in the above item, wherein said surfactant is generated using dioleoyl phosphatidylcholine (DOPC), dioleoyl phosphatidylethanolamine (DOPE), dioleoyl phosphatidylserine (DOPS), eggPC, stearyl trimethyl ammonium chloride (STAC), stearyl trimethyl ammonium bromide (STAB), sodium dodecyl sulfate (SDS), dodecyl trimethyl ammonium chloride, pentaethylene glycol dodecyl ether or the like.

(29) The apparatus as described in the above item, wherein said insulating fluid is a substance that is non-volatile, non-conductive, and fluent under normal temperature and normal pressure, and has a specific gravity with respect to said micrometer-sized dielectric body of within ±50%.

(30) The apparatus as described in the above item, wherein said insulating fluid is selected from the group consisting of mineral oil, liquid paraffin, alkane and silicone oil.

(31) The apparatus as described in the above item, wherein said electric field is a constant electric field.

(32) The apparatus as described in the above item, wherein said electric field is subject to the range from 1 V to 1000 V.

(33) The apparatus as described in the above item, wherein a positive electrode and a negative electrode for generating said electric field are arranged asymmetrically so that their central axes are not parallel with each other.

(34) The apparatus as described in the above item, wherein said electrode has a pyramid or conical shape having a sharp tip, or a prismatic or cylindrical shape, and has a material having conductivity.

(35) The apparatus as described in the above item, wherein said electrode is a conductive substance selected from the group consisting of tungsten, tungsten carbide, gold, platinum, silver, copper, iron and aluminum.

(36) The apparatus as described in the above item, wherein said means for applying an electric field is a set of at least two electrodes of a positive electrode and a negative electrode, and the orientation of the set of at least two electrodes is such that at least two are in different directions each other.

(37) The apparatus as described in the above item, further including a micromanipulator capable of manipulating each of three-dimensional coordinates by 1 μm, the micromanipulator manipulating each coordinate to shift an electrode to a desired position, or further including tweezers.

(38) The apparatus as described in the above item, further including a means for transporting said dielectric body by indirectly controlling the dielectric body by spatial control of said electrodes and control of intensity of an applied voltage.

(39) The apparatus as described in the above item, further including a micro-turbine. Such micro-turbine includes a water wheel by a $SiO_2$ layer processed into a micrometer-size (for example, those used in Y. Hiratsuka, M. Miyata, T. Tada, T. Q. Uyeda, Proc. Natl Acad. Sci. USA 103, 13618-13623 (2006) and the like).

(40) The apparatus as described in the above item, wherein there are a plurality of said dielectric bodies, and the plurality of dielectric bodies are caused to collectively move to function as a motor.

(41) The apparatus as described in the above item, for use in mechanical control of a polymer, liquid droplet transportation of a pharmaceutical, a chemical reaction, pharmaceutical preparation, non-contact transportation of a biological sample, or a micro-channel.

In every aspect as described above, it is understood that each embodiment described in the present specification can be applied in other aspects as far as it is applicable.

Technical Effects of the Invention

From the above, the present invention has succeeded in making a micrometer-sized dielectric body generate mechanical motion by applying a constant electric field. Therefore, the present invention has provided rotary-motor-like motion, and achieved capability of generating oscillatory and periodic motion not possible in an AC electric field. Also the present invention has achieved that the route of motion and the mode of motion can be changed at will by intensity of the electric field and a spatial arrangement of the electrodes rather than by the motion of a current because a current does not occur. Additionally, the point that motor-like motion can be extracted without contact in a constant electric field is important, and it has revealed that an object can be transported in a non-contact manner.

In particular, as shown in FIG. 3, only simple periodic motion can be extracted when the electrodes are arranged so that they are aligned (Non-Patent Document 1), however, when the electrodes are arranged so that they are not aligned as shown in the center view and the right view of FIG. 3, it is possible to extract cyclic motion since the state using both the force acting on a charged body (see FIG. 4(i)) and the dielectric force (see FIG. 4(ii)) among the forces acting on the dielectric body can be realized. Whether or not such a state is realizable cannot be anticipated by conventional techniques, and is not obvious in a textbook level, and hence it can be said to be a novel technique.

This point is not easily conceivable from the formula itself described in Non-Patent Document 1 or the like, and it can be said that one significant effect of the present invention lies in that the present invention first accomplishes cyclic motion which is an unanticipated phenomenon achieved by employing the arrangement that the central axes of two electrodes are not aligned.

Lastly, although it is generally difficult to extract work from mechanical motion in micrometer-sizes where the Reynolds number is low, the present invention is significant in making it possible.

BRIEF DESCRIPTION OF THE SEVERAL VIEWS OF THE DRAWINGS

The same reference numeral appearing in multiple figures denotes an identical element.

FIG. 1C(b) is a view of an experimental setting from above (microscopic image). The X-Y coordinate is a horizontal plane. Here, in FIG. 1C(a) and FIG. 1C(b), 100 denotes a water droplet, 102 denotes mineral oil, 104 denotes a negative electrode, 106 denotes a glass slide, 108 denotes a constant voltage, 110 denotes a positive electrode, and 112 denotes an objective lens of a microscope.

$$x=(x,y)$$ [Mathematical formula 1]

is the center of a water droplet. (l,d) is a vertex of a positive electrode.

Figure 2:
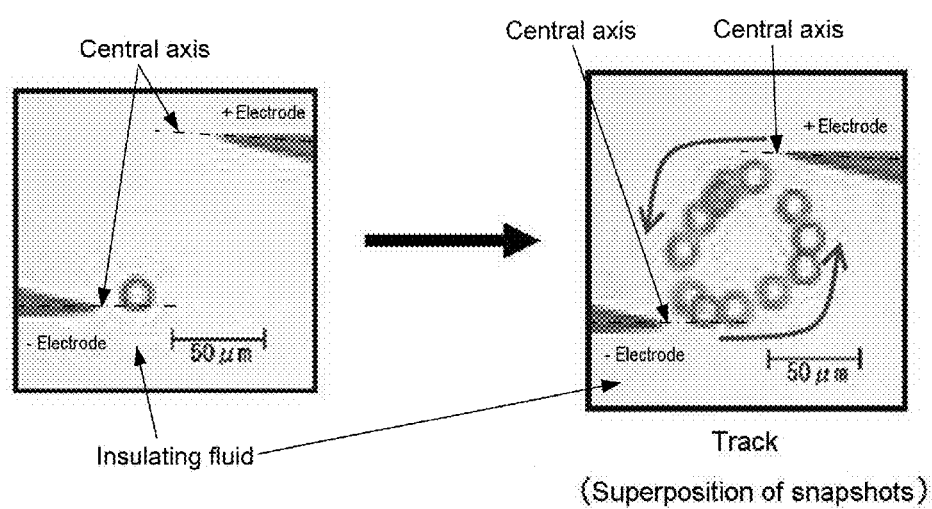
Figure 2A:
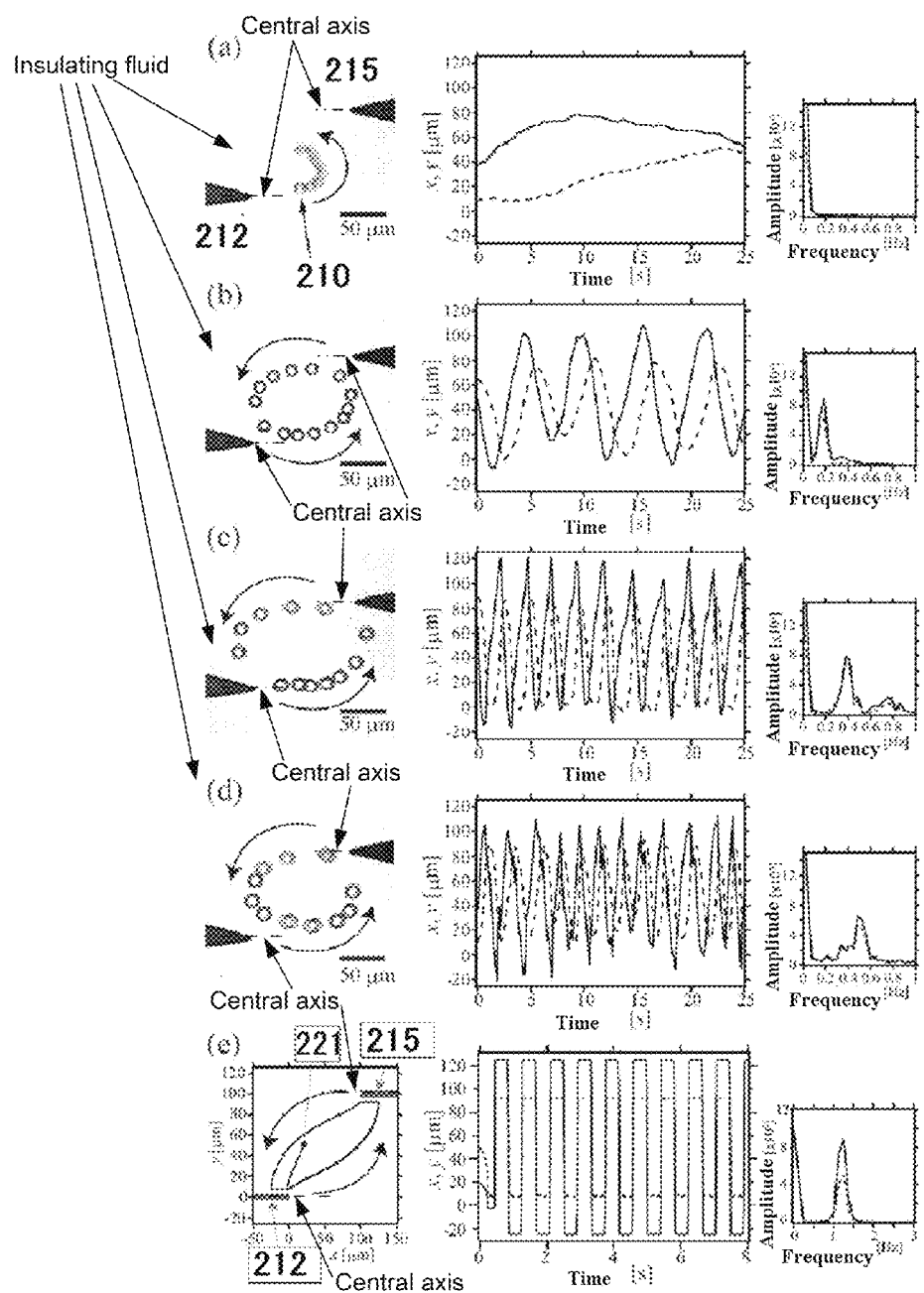

FIG. 2 shows an experimental setup on the left and a composite photograph superposing serially taken snapshots of one water droplet that makes cyclic motion on the right. Electrode: made of tungsten, Surfactant: phospholipid DOPC FIG. 2A(a) to FIG. 2A(d) show rotational motion of a water-in-oil (w/o) micro-droplet. l=d=100 μm was satisfied. The size of the liquid droplet was r=17.1 μm. The left views show superposed snapshots of the liquid droplet. The center views column show time-dependent variation of the liquid droplet. It is shown by x (solid line) and y (dashed line). The right views show spectra of Fourier transform (FT) thereof. It is shown by x (solid line) and y (dashed line). In FIG. 2A(a), V=20V, and snapshots of every 2 seconds are shown. In FIG. 2A(b), V=60V, and snapshots of every 0.4 seconds are shown. In FIG. 2A(c), V=120V, and snapshots of every 0.2 seconds are shown. In FIG. 2A(d), V=160V, and snapshots of every 0.2 seconds are shown. FIG. 2A(e) shows a numerical simulation. The left view column shows a track of a liquid droplet. The center view column shows time-dependent data. The right view column shows a spectrum of Fourier transform. Here, in FIG. 2A(a) to (e), 221 denotes a starting point. 210 denotes a droplet, 212 and 215 denote electrodes. The constant electric field and numeric parameters used in the simulation of FIG. 2A(e) are as described in the examples.

Figure 3:
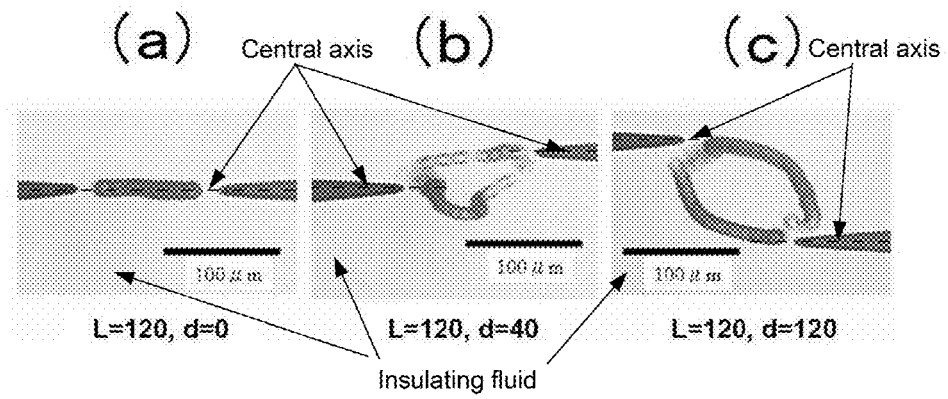

FIG. 3 shows superposed snapshots (another experimental example). In the figure, the numbers (a) to (c) show the respective arrangements of electrodes. Here, (a) arrangement of electrodes (left): 120 μm in the direction parallel to central axis, 0 μm in the perpendicular direction; (b) arrangement of electrodes (center): 120 μm in the direction parallel to central axis, 40 μm in the perpendicular direction; and (c) arrangement of electrodes (right): 120 μm in the direction parallel to central axis, 120 μm in the perpendicular direction. In this experiment (c), the arrangement of electrodes is varied. The electrode is made of tungsten carbide, and the surfactant is phospholipid DOPC.

Figure 4:
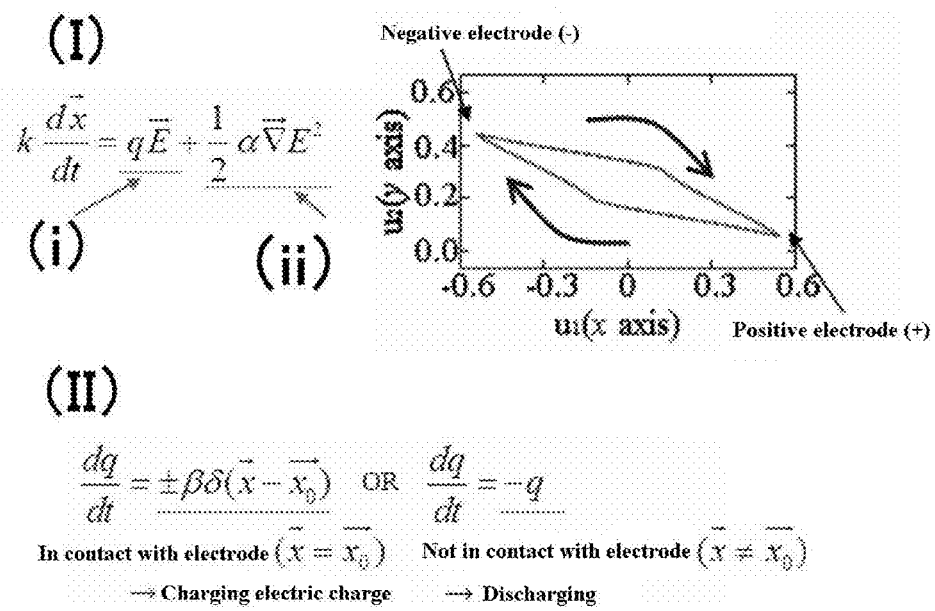

FIG. 4 shows a physical model and a result of simulation. An equation of motion explaining the present invention is described on the left, and calculation results thereof are shown on the right. That is, FIG. 4 left (I) indicates an equation of motion when the viscosity is strong (over-damped system). As to the right side of the equation of motion, (i) the first term of the right side represents the force acting on a charged body, wherein it is shown that a charged dielectric body attracts or repels to an electrode; and (ii) the second term of the right side represents the force acting on the dielectric body, wherein it is shown that the dielectric body is attracted to the side where the density of line of electric force is high. FIG. 4 left (II) indicates an equation regarding charging and discharging of electric charge, representing the case when the electrodes are in contact with each other, and the case when the electrodes are not in contact with each other. When the electrodes are in contact with each other, charging of electric charge occurs, whereas when the electrodes are not in contact with each other, discharging occurs. The right above the graph in FIG. 4 shows a result of simulation. Since the directions of the forces of (i) and (ii) shown in FIG. 4 left (I) are different from each other, the direction of motion is determined by this balance. That is, rotational motion occurs by a balance.

Figure 5:
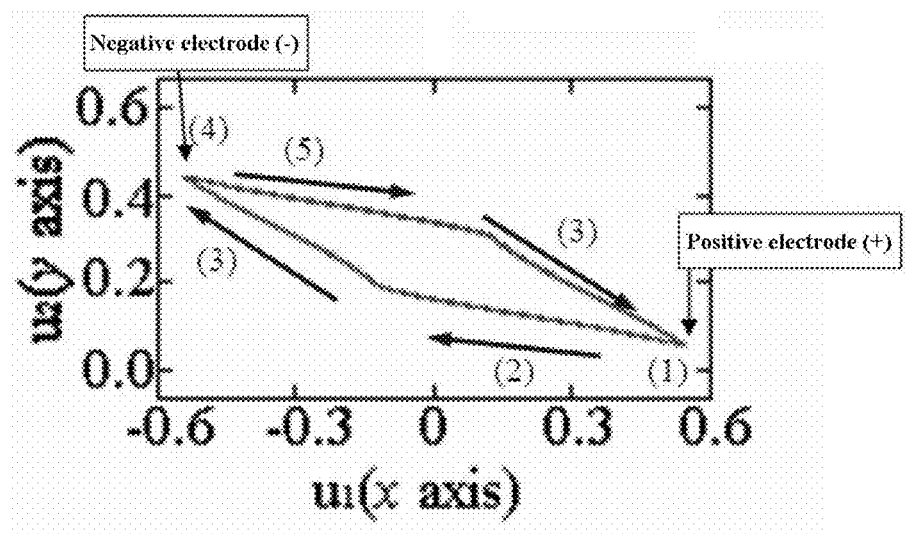

FIG. 5 is a schematic view specifically explaining the result of simulation. The numbers (1) to (5) in the figure respectively show (1) a dielectric body is charged with an electric charge from a positive electrode; (2) the positive electrode and the positively charged dielectric body repel each other by electrostatic repelling force, and the positive charge gradually leaks; (3) an electrostatic attractive force acts, and comes into contact by being attracted to a negative electrode of the electrodes; (4) the dielectric body is charged with an electric charge from the negative electrode; (5) an electrostatic repelling force occurs between the negative electrode and the negatively charged dielectric body and the electric charge gradually leaks.

Figure 5A:
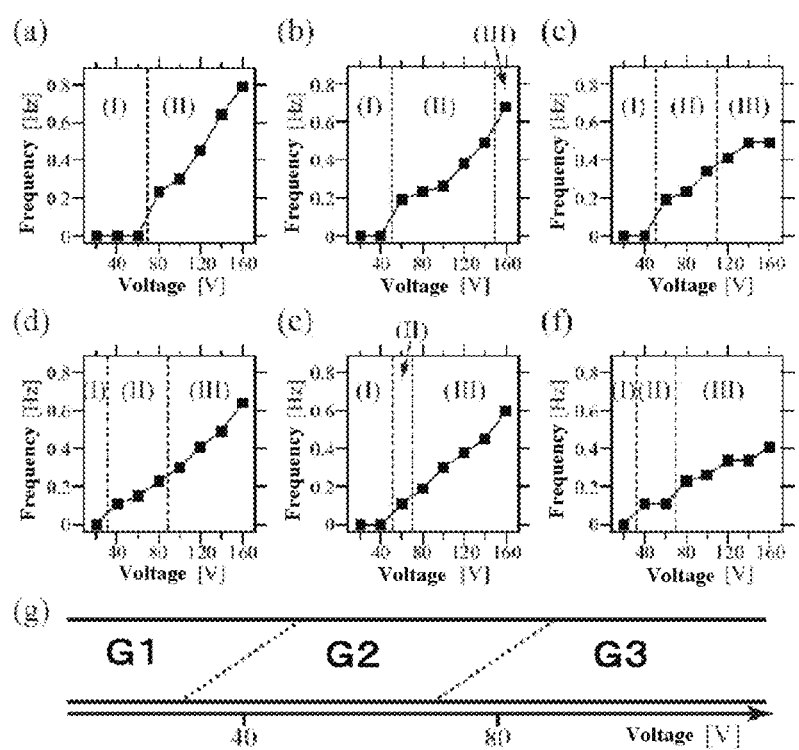

In FIG. 5A, FIG. 5A(a) to FIG. 5A(f) are experimental results indicating the dependency of frequency of rotational motion on the applied voltage. In FIG. 5A(a), r=14.0 μm (r represents a diameter of a droplet), in FIG. 5A(b), r=17.1 μm, in FIG. 5A(c), r=18.8 μm, in FIG. 5A(d), r=19.5 μm, in FIG. 5A(e), r=31.8 μm, and in FIG. 5A(f), r=34.6 μm. Regions (I) to (III) correspond to motion modes in the phase diagram in FIG. 5A(g). FIG. 5A(g) shows motion of a liquid droplet depending on the applied voltage. Here, in FIG. 5A(g), G1 denotes (mode I) non-rotational motion, G2 denotes (mode II) rotational motion, and G3 denotes (mode III) rotational motion accompanied by bounding on electrode.

Figure 6:
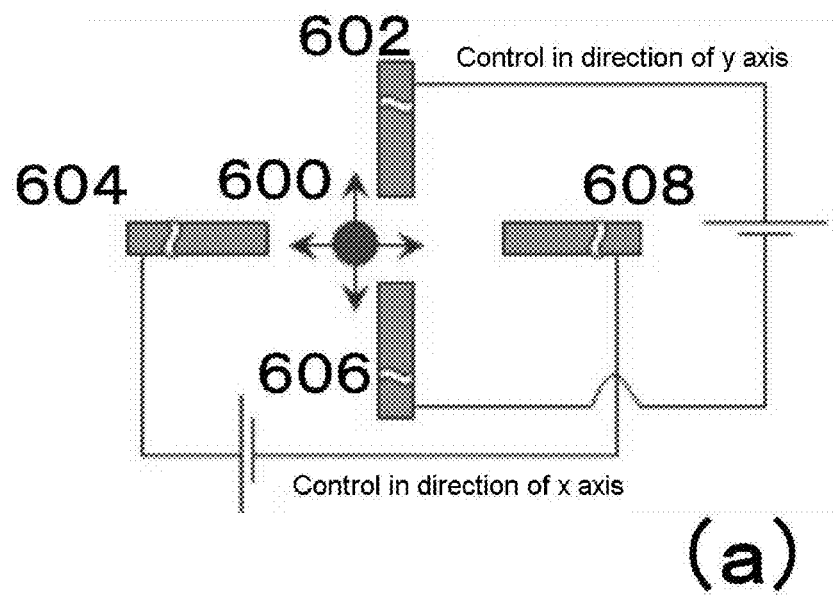
Figure 6:
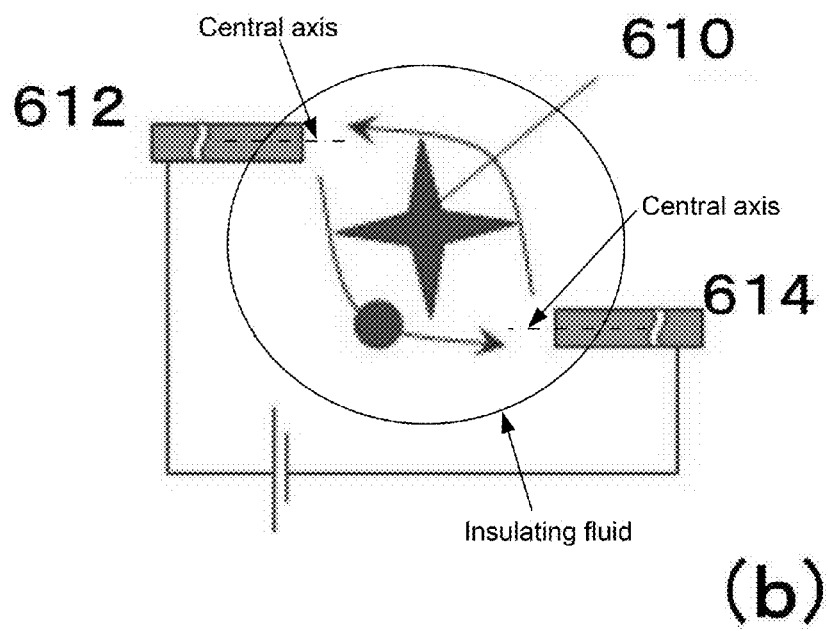

FIG. 6 shows schematic views showing transportation at will and extraction of work. In the figures, the letters (a) and (b) respectively show (a) transportation at will; and (b) extraction of work. As to reference numerals, 600 denotes a micrometer-sized dielectric body, 610 denotes a micro-turbine, and 602, 604, 606, 608, 612 and 614 denote electrodes.

Figure 7:
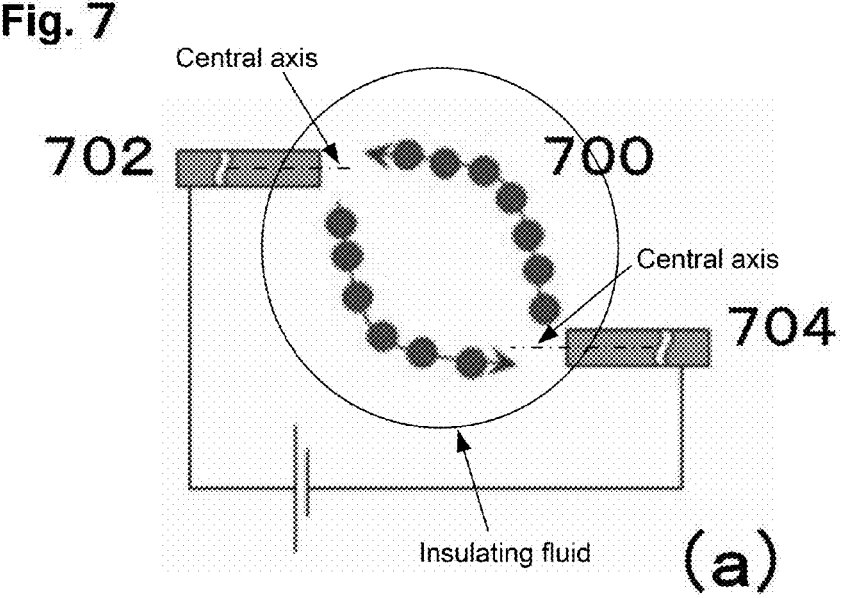
Figure 7:
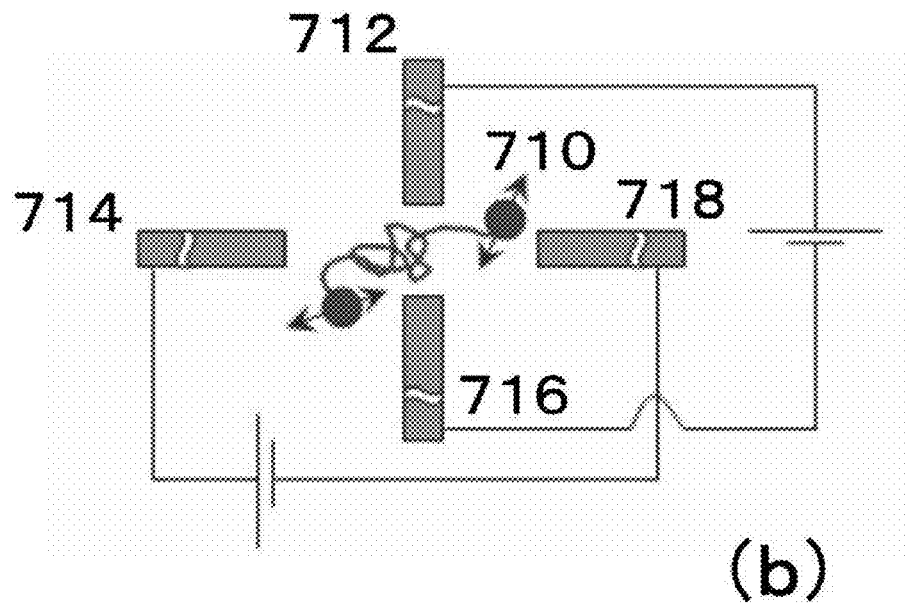

FIG. 7 shows schematic views showing a motor by collective motion of micrometer-sized dielectric bodies and mechanical control of a polymer. In the figure, the numbers (a) and (b) respectively show (a) motor by collective motion of micrometer-sized dielectric bodies; and (b) mechanical control of polymer. As to reference numerals, 700 denotes a micrometer-sized dielectric body, 710 denotes a polymer, and 702, 704, 712, 714, 716 and 718 denote electrodes.

Figure 8:
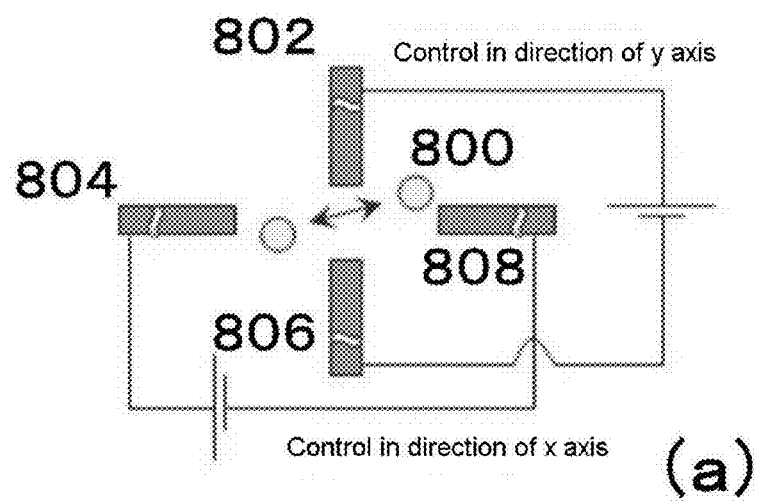
Figure 8:
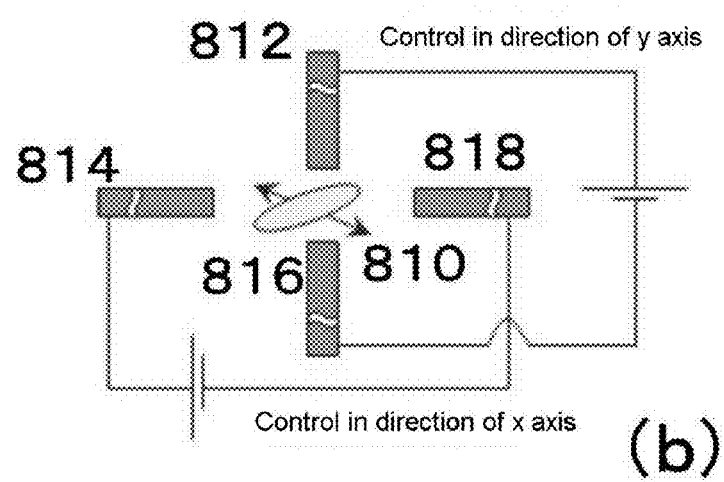

FIG. 8 shows schematic views showing liquid droplet transportation of a pharmaceutical or chemical or the like, a chemical reaction by fusion of liquid droplets, pharmaceutical or chemical preparation, and non-contact transportation of a biological sample such as a cell. In the figure, the numbers (a) to (c) respectively show (a) liquid droplet transportation of pharmaceutical or chemical or the like, a chemical reaction by fusion of liquid droplets, and pharmaceutical or chemical preparation; and (b) non-contact transportation of a biological sample such as a cell. Since a cell is damaged by contact, the point of "non-contact" is very important. Waste of liquid is avoided, and a low cost is realized, and one also having the nature of μTAS can be realized. As to reference numerals, 800 denotes a liquid droplet, 810 denotes a biological sample, and 802, 804, 806, 808, 812, 814, 816 and 818 denote electrodes.

Figure 9:
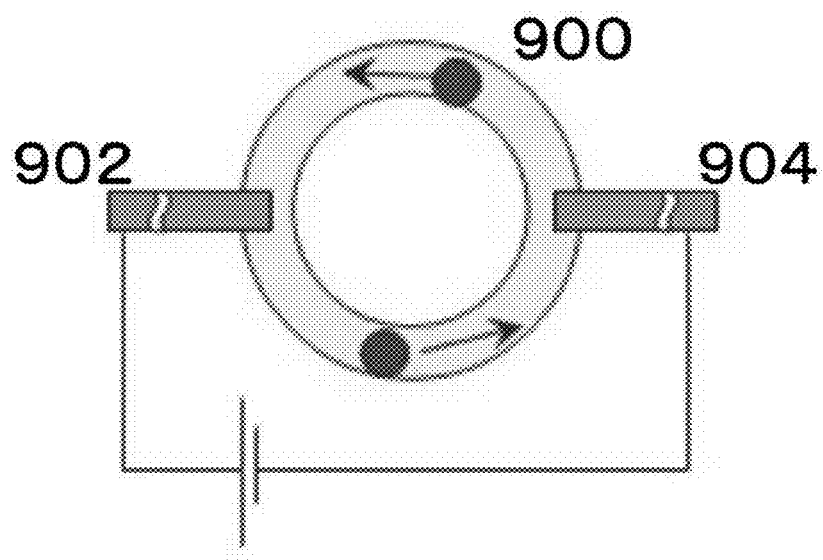

FIG. 9 shows a schematic view showing a micro-channel. A dielectric body is introduced into a circular micro-channel. Larger rotational motion is extracted by combination with a micro-channel. As to reference numerals, 900 denotes a circular micro-channel, and 902 and 904 denote electrodes.

DETAILED DESCRIPTION

In the following, the present invention will be described. Throughout the present specification, it is to be understood that the expression of a singular form involves the concept of its plural form unless otherwise noted. Therefore, it is to be understood that articles for a singular form (for example, "a", "an", "the" and the like in English) involve the concept of its plural form unless otherwise noted. Further, it is to be understood that terms used in the present specification are used in the meanings commonly used in the art unless otherwise noted. Therefore, all of the technical terms and scientific and technical terms used in the present specification have the same meanings that are commonly recognized by a person skilled in the art to which the present invention pertains unless otherwise defined. In the case of contradiction, the present specification (including definition) has preference.

DEFINITIONS OF TERMS

In the present specification, "dielectric body" refers to a substance not having a free electron that plays a role in electric conduction, and generating electric polarization upon application of an electric field. Typically, the dielectric body refers to a substance that generates dielectric polarization but does not generate a current upon application of an electrostatic field, and has electrostatic chargeability. The dielectric body includes, for example, a water droplet, a polymeric substance (for example, a polystyrene bead, polydimethylsiloxane (PDMS), a polyacrylamide gel) and a glass bead.

In the present specification, "transportation" has the same meaning as that commonly used in the art, and refers to making a target object move.

In the present specification, "mechanical work" which is also called "work" refers to energy transfer occurring when the force having its component in the direction that the object moves is applied on the object, and the object moves. It is equal to primary integration of the force in the entire course that the object moves.

In the present specification, "insulating fluid" refers to a fluent substance that does not conduct electricity. Liquids and gases that are non-volatile, non-conductive, and fluent under normal temperature and normal pressure are preferable, and those having a specific gravity with respect to a micrometer-sized dielectric body of within about ±50% are advantageously used. For example, as the insulating fluid, mineral oil, liquid paraffin, alkane and silicone oil can be used. Preferably, the insulating fluid is provided in a container. The insulating fluid may be a non-electrolyte.

In conventional techniques, it has been difficult to realize a motor under high viscosity as is in the case of a micrometer-sized object. The present invention has succeeded in realizing this. The technique of the present invention is also featured by the capability of realizing the motor regardless of such high viscosity. Of course, it is understood that the present invention may be practiced even in the case of low viscosity.

In the present specification, "electric field" is used in the meaning commonly used in the art, and refers to a basic field of the natural world responsible for an electric body to attract or repel other charged bodies, and is also called a field. Usually, it is generated by a plurality of electrodes (positive electrode and negative electrode).

In the present specification, "constant electric field" refers to an electric field of a constant value. For example, it may be one being subject to the range of 1V to 1000V, but it is not limited thereto. The present invention provides an advantage over conventional techniques in that mechanical motion such as periodic motion or rotational motion can be extracted even with a constant electric field.

In the present specification, the electric field is typically generated by a set of a positive electrode and a negative electrode. The electrode has a pyramid or conical shape having a sharp tip, or a prismatic or cylindrical shape, and is realized by a conductive material. The electrodes include electrically conductive materials such as tungsten, tungsten carbide, gold, platinum, silver, copper, iron and aluminum. For example, an electric field is generated by a set of at least two electrodes of a positive electrode and a negative electrode, and the orientation of the set of at least two electrodes are such that at least two are in different directions each other, and the route or mode of motion can be changed by controlling said electric field and a spatial arrangement of the electrodes for generating the electric field.

Here, control is realized by using a micromanipulator capable of manipulating each of three-dimensional coordinates by 1 μm, and manipulating each coordinate to shift an electrode to a desired position by manipulation with a means such as a finger grip as necessary, for example, or by manipulation with a hand or tweezers.

In the present specification, "micrometer-size" generally ranges from several nm to about 1000 μm, and in some case, ranges from submicron (0.1 μm) to 1000 μm, and among these, the range from 1 μm to 100 μm where the present technique can be effectively used is particularly preferred, but the range is not limited thereto. Here, the term several nm means at least 1 nm, and it is understood that an assembly of molecules of about sub nm to 1 nm will have this size, and means typically about 2 to 3 nm or larger, but it is not limited thereto. A lower limit would be realized with a dielectric body of several nm formed by an assembly of molecules of about sub nm to 1 nm. On the other hand, not wishing to be bound to a theory, at least 1000 μm is employed as an upper limit because a person skilled in the art recognizes that the principle of the present invention is applicable at least in a scale of μm, namely in the range up to 1000 μm. In a larger millimeter scale, the equation (principle) that governs the phenomenon can differ, however, the application of the present invention is not excluded, and it is to be understood that the present invention can be practiced as far as the principle of the present invention is applicable even for a size larger than 1000 μm.

In the present specification, "surfactant" is a substance having a hydrophilic group and a hydrophobic group in one molecule, and capable of forming a water droplet in a hydrophobic oil liquid. In this case, the surfactant is typically present at the interface between oil and water. Examples of the surfactant include, but are not limited to, alkyl sulfates (e.g., sodium dodecyl sulfate (SDS)), alkyltrimethylammonium salts (e.g., stearyl trimethyl ammonium chloride (STAC), dodecyl trimethyl ammonium chloride, stearyl trimethyl ammonium bromide (STAB)), polyoxyethylenealkylethers (e.g., pentaethylene glycol dodecyl ether), diacylphosphatidylcholines (e.g., dioleoyl phosphatidylcholine (DOPC), dipalmitoyl phosphatidylcholine (DPPC)), diacyl phosphatidylethanolamines (e.g., dioleoyl phosphatidylethanolamine (DOPE), dipalmitoyl phosphatidylethanolamine (DPPE)), diacyl phosphatidylserines (e.g., dioleoyl phosphatidylserine (DOPS), dipalmitoyl phosphatidylserine (DPPS)), diacyl phosphatidylglycerol (e.g., dioleoyl phosphatidylglycerol (DOPG), dipalmitoyl phosphatidylglycerol (DPPG)) and eggPC. For example, there are other substances that can be used, and for example, as to diacyls, those having these four suffixes PC/PE/PS/PG are often used, however, such substances include a number of substances having prefixes of DO/DP/DS/ . . . and the like, and these can also be used in the present invention.

In the present specification, "micro-turbine" is, for example, an object of 1 μm to 100 μm in size that can be fabricated by a micro-fabrication technique, including a rotation axis and a part of a blade which is rotatable about the rotation axis. For example, such includes a water wheel by a $SiO_2$ layer processed into a micrometer-size (for example, those used in Y. Hiratsuka, M. Miyata, T. Tada, T. Q. Uyeda, Proc. Natl Acad. Sci. USA 103, 13618-13623 (2006) and the like). Using the micro-turbine, said dielectric body may be arranged in a space where it can move, and work can be extracted from the micro-turbine that moves by motion of the dielectric body. Here, the micro-turbine has a rotation axis and a part of a blade, and the blade is preferably rotatable.

In one embodiment of the present invention, there are a plurality of dielectric bodies, and by making the plural dielectric bodies move collectively, the function of a motor can be achieved.

Description of Preferred Embodiments

In the following, preferred embodiments of the present invention will be described, and it is to be understood that the present invention is not limited to these preferred embodiments, and can be appropriately modified by a person skilled in the art based on the entire description of the present specification.

Method of Generating Cyclic Motion and its Application

In one aspect, the present invention provides a method of transporting a dielectric body or extracting mechanical work, including the step of A) arranging two electrodes for generating an electric field so that the central axes of the two electrodes are not aligned, and applying an electric field to the dielectric body in an insulating fluid.

The present invention has its significance in realizing cyclic motion which is very important, rather than simply making a liquid droplet move, and is said to be outstanding in that cyclic motion can be achieved by the feature of arranging two electrodes so that their central axes are not aligned, that is not simply anticipated in the technique as described in a conventional technique (for example, Non-Patent Document 1). It has also been demonstrated that work can be extracted by using the cyclic motion as in the preset invention.

Therefore, since cyclic motion cannot be extracted in a highly-symmetric form where the central axes of the electrodes are aligned, it can be advantageous to arrange the electrodes so that their central axes are not aligned and preferably to arrange unparallel with each other.

In the present specification, the expression "the central axes of the two electrodes are not aligned" concerns the arrangement of two electrodes for generating an electric field, and means that the central axes of these electrodes are not arranged in one straight line. Here, "the central axis of electrode" is used in the meaning commonly used in the art, and refers to a central line that is parallel in the direction of the maximum length in the sharp electrode shape as described above. Preferably, the central axes are advantageously arranged so that they are not parallel with each other.

Figure 1:
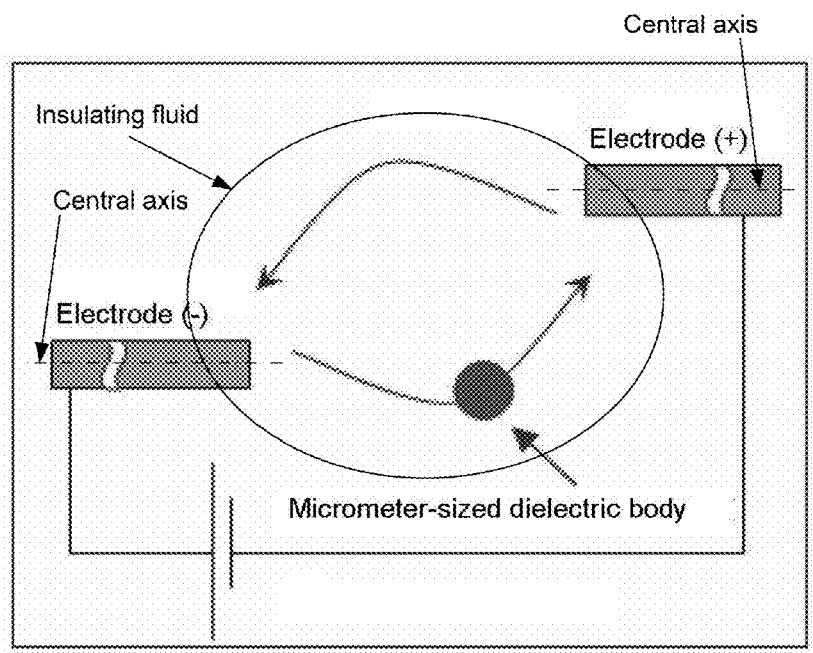
FIG. 1 is a conceptual view of micrometer-sized object transportation.

It has been found that a dielectric body can be transported at will in the three-dimensional manner only by applying a constant electric field to the dielectric body of micrometer-size, and as a result, mechanical work can be extracted (FIG. 1). In the present invention, the dielectric body is an arbitrary dielectric object such as a water drop, a polyethylene bead, and a glass bead, for example, and it has revealed that the micrometer-sized object is independent of the substance or the shape as far as it is a dielectric body. It has also revealed that the ambient medium may be any insulating fluid without being limited to oil. Lastly, although it is generally difficult to extract work from mechanical motion in micrometer-sizes where the Reynolds number is low, the present invention is significant in making it possible. The present invention has succeeded in generating mechanical motion in a micrometer-sized dielectric body by applying a constant electric field.

Therefore, the present invention has provided rotational-like motion, and achieved capability of generating oscillatory and periodic motion not in an AC electric field. Also the present invention has achieved that the route of motion and the mode of motion can be changed at will by intensity of the electric field and a spatial arrangement of the electrodes rather than by the motion of a current because a current does not occur. Additionally, it is important that rotational-like motion can be extracted without contact in a constant electric field, and it is advantageous in that the capability of transporting an object in a non-contact manner is revealed and that application of a micro-motor that is conventionally impossible is enabled.

In conventional techniques, as shown in FIG. 3(a), only simple periodic motion can be extracted when the electrodes are arranged so that they are aligned (Non-Patent Document 1). However, as disclosed in the present invention, when the electrodes are arranged so that they are not aligned as shown in the center view and the right view of FIGS. 3(b) and (c), it is possible to extract cyclic motion since the state using both the force acting on a charged body (see FIG. 4(i)) and the dielectric force (see FIG. 4(ii)) among the forces acting on the dielectric body can be realized. Whether or not such a state is realizable cannot be anticipated by conventional techniques, and is not obvious in a textbook level, and hence it can be said to be a novel technique. Further, the present invention is critical in that two- or more-dimensional motion that is essentially entirely different from the one-dimensional motion in Non-Patent Document 1 in spatial terms is realized by the measure of "arranging electrodes so that they are not aligned."

On the other hand, it is understood that the present invention is not limited to the embodiments indicated in examples. That is, the phenomenon of the present invention is within the category of laws of physics, and can be naturally explained by a combination of the most fundamental universal governing principles such as an equation of motion and principles of electromagnetics. That is, based on the description of the present specification, for other embodiments, the phenomenon demonstrated in the present invention can be anticipated using the knowledge of the art such as physical principles, and the design can be varied. That is, what condition and how the condition should be changed to generate desired motion can be determined by calculation without conducting an experiment.

Therefore, success in theoretical explanation means establishment of a base for developing a kind of simulator.

The technique disclosed in the present invention leads to provision of very useful methodology in applying the same. Establishment of a theoretical framework of a certain phenomenon does not evidence that the phenomenon is ordinary. It can be said that it is a means for applications ahead.

The present invention cannot be anticipated from general physical theory textbooks. This is because in a general textbook, "force acting on a charged body" is not generally applied to a dielectric body. That is, it is generally treated such that only the force regarded as "force acting on a dielectric body" acts on a dielectric body. In addition, in a generally known technique called dielectrophoresis, the force acting on the dielectric body is used in "a liquid such as water or oil" by applying "a periodic electronic field (inconstant electric field)." Therefore, it can be said that in the present invention, "fusion of the force acting on the charged body and the force acting on the dielectric body" and "extraction of cyclic motion in a constant electric field" are not easily anticipated from general physical theory textbooks and other theses.

The theory that is found in the present invention itself is a new finding, and the present invention is outstanding in finding a phenomenon of cyclic motion, leading achievement of the present invention of transportation and extraction of work, and then succeeding in explaining whether the motion found in the present invention is possible by using a basic law of physics. That is, the present invention is worthy of being noticed also in that it can be practiced not only in the embodiments shown exemplarily but also in an arbitrary embodiment designed based on the theory presented in the present invention. In other words, it is to be noted that the theory of the present invention is not easily derived from the matters described in conventional textbooks, and the flow is not so simple that an experiment conducted using the same gives the result as expected.

The insulating fluid used in the present invention may be any substance that does not conduct electricity and is fluent, and liquids and gases that are non-volatile, non-conductive, and fluent under normal temperature and normal pressure are preferable, and those having a specific gravity with respect to a micrometer-sized dielectric body of within ±50% are advantageously used. For example, as the insulating fluid, mineral oil, liquid paraffin, alkane, and silicone oil may be used. Preferably, the insulating fluid is provided in a container. As such a container, any container may be used as far as it is compatible to the insulating fluid.

In conventional techniques, it has been difficult to realize a motor under high viscosity as is in the case of a micrometer-sized object. The present invention has succeeded in realizing this. The technique of the present invention is also featured by the capability of realizing the motor regardless of such high viscosity. Of course, it is understood that the present invention may be practiced even in the case of low viscosity. As indicated by the physical model shown in FIG. 4 and the description of the result of simulation, it can be understood that the intensity of viscosity is not relevant.

In the present invention, it is possible to provide an advantage over conventional techniques in that mechanical motion such as periodic motion or rotational motion can be extracted even in a constant electric field.

In one embodiment, the dielectric body used in the present invention preferably has a micrometer-size. As the size of the dielectric body, typically, any of length, width and height may be measured, and the size of the part that is most suitable to the simulation may be employed. Generally, the micrometer-size refers to the region of μm and the range smaller than the same, and generally ranges from several nm to about 1000 μm, and in some case, ranges from submicron (0.1 μm) to 1000 μm, and among these, the range from 1 μm to 100 μm where the present technique can be used particularly effectively, but it is not limited thereto. In one embodiment, it ranges from 1 μm to 100 μm, and in another embodiment, it ranges from 5 μm to 50 μm, from 10 μm to 100 μm, from 1 μm to 10 μm, or the like, but it is not limited thereto. Among these, it can be the range from 1 μm to 100 μm where the present technique can be effectively used, but it is not limited thereto. Here, the term several nm means at least 1 nm, and it is understood that the size of an assembly of molecules of about sub nm to 1 nm is applicable, and means typically about 2 to 3 nm or larger, but it is not limited thereto. A lower limit would be realized with a dielectric body of several nm formed by an assembly of molecules of about sub nm to 1 nm. On the other hand, not wishing to be bound to a theory, at least 1000 μm may be employed as an upper limit because a person skilled in the art recognizes that the principle of the present invention is applicable at least in a scale of μm, namely in the range up to 1000 μm. In a larger millimeter scale, the equation (principle) that governs the phenomenon can differ, however, application of the present invention is not excluded, and it is to be understood that the present invention can be practiced as far as the principle of the present invention is applicable even for a size larger than 1000 μm.

In another embodiment, the dielectric body used in the present invention is a substance that generates dielectric polarization but does not generate a current upon application of an electrostatic field, and any substance having electrostatic chargeability can be used. The dielectric body used in the present invention includes, for example, a water droplet, a polymeric substance (a polystyrene bead, polydimethylsiloxane (PDMS), a polyacrylamide gel, other plastics and the like) and a glass bead.

When a water droplet which is one embodiment is used, preferably, the water droplet is generated by using a surfactant. As the surfactant, any substance having a hydrophilic group and a hydrophobic group in one molecule and capable of forming a water droplet in a hydrophobic oil liquid may be used according to the purpose. In this case, the surfactant is present at the interface between oil and water. As the surfactant that can be used in the present invention includes alkyl sulfates (e.g., sodium dodecyl sulfate (SDS)), alkyltrimethylammonium salts (e.g., stearyl trimethyl ammonium chloride (STAC), dodecyl trimethyl ammonium chloride, stearyl trimethyl ammonium bromide (STAB)), polyoxyethylenealkylethers (e.g., pentaethylene glycol dodecyl ether), diacylphosphatidylcholines (e.g., dioleoyl phosphatidylcholine (DOPC), dipalmitoyl phosphatidylcholine (DPPC)), diacyl phosphatidylethanolamines (e.g., dioleoyl phosphatidylethanolamine (DOPE), dipalmitoyl phosphatidylethanolamine (DPPE)), diacyl phosphatidylserines (e.g., dioleoyl phosphatidylserine (DOPS), dipalmitoyl phosphatidylserine (DPPS)), diacyl phosphatidylglycerol (e.g., dioleoyl phosphatidylglycerol (DOPG), dipalmitoyl phosphatidylglycerol (DPPG)) and eggPC.

In a preferred embodiment, the insulating fluid used in the present invention is a non-volatile, non-conductive and fluent substance. The reason why the insulating fluid is preferably non-volatile is because it is appropriate for long-term transportation and movement of the dielectric body, and it is appropriate not to inhibit transportation and movement of the dielectric body by the convection of a liquid by evaporation. Preferably, non-volatility of such a degree that only 0.1% or less in volume of volatilization is observed per a day at normal temperature and normal pressure is advantageous. The reason why the insulating fluid of the present invention is preferably non-conductive is because the intensity of the electric field acting on the dielectric body can be ensured, and the efficiency of charging to the electric charge of the dielectric body is improved.

Further, the specific gravity of the insulating fluid of the present invention preferably has a specific gravity within ±50% with respect to the dielectric body used in the present invention. This is because if the specific gravity is extremely different during transportation and movement of the dielectric body, it is impossible to achieve smooth transportation and movement.

The insulating fluid that may be used in the present invention includes mineral oil, liquid paraffin, alkane, silicone oil and the like.

Preferably, the electric field used in the present invention is a constant electric field. The present invention is outstanding in that it can be equally used in a constant electric field, and dynamic motions such as periodic motion and rotational motion like transportation and extraction of work can be executed.

In a preferred embodiment, the electric field used in the present invention is subject to the range from 1V to 1000V, and preferably 5V to 50V, 50V to 500V, or 10V to 100V, however, it is understood that the appropriate use range differs depending on a dielectric body being used and an arrangement of electrodes.

Figure 1A:
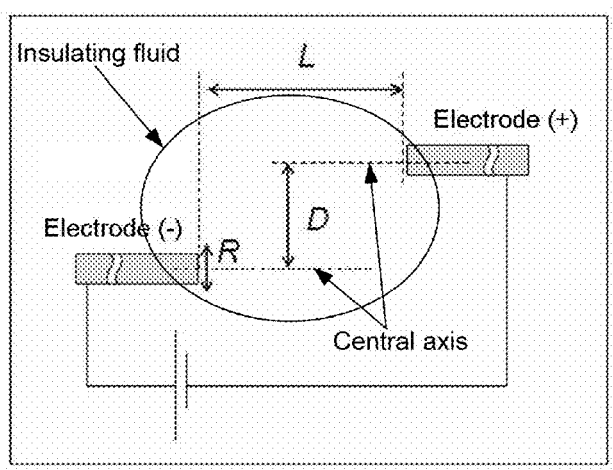
FIG. 1A is a schematic view when a positive electrode and a negative electrode are arranged so that their central axes are not aligned. It is advantageous that the positive electrode and the negative electrode forming an electric field used in the present invention are arranged so that their central axes are not aligned.
Figure 1B:
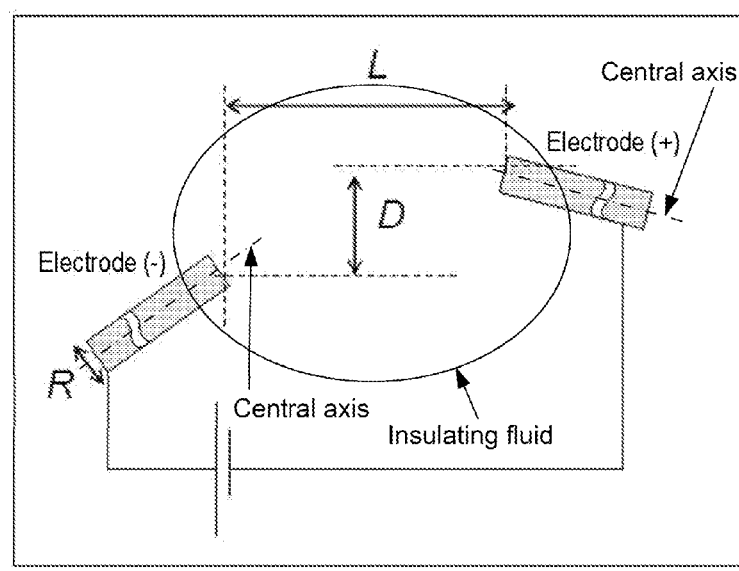
FIG. 1B is a view illustrating the case where the central axes are not parallel. This illustrates that cyclic motion can be extracted much more than in the parallel case.

In one embodiment, the positive electrode and the negative electrode that form the electric field used in the present invention are advantageously arranged so that their central axes are not aligned. This point can be described by referring to FIG. 1A. That is, for example, as a guide, when difference (D) between central axes of electrodes is equal to or more than electrode diameter (R) and within about 5 times width (L) between tip ends of the electrodes, cyclic motion can be extracted more effectively. That is, when the requirement of R<D<5 L is satisfied in FIG. 1A, effective extraction can be achieved. Further, as shown in FIG. 1B, when the central axes are not parallel with each other, cyclic motion is rather easy to be extracted, and the lower limit of the requirement can be loosen as is 0<D<5 L. At any hand, not limited to these requirements, the range may be extended by the electrode shape, applied voltage and the like.

In another embodiment, the electrode used in the present invention has a pyramid or conical shape having a sharp tip, or a prismatic or cylindrical shape, and is formed of a material having conductivity. In the case of a pyramid or conical shape, such sharpness that the angle of the tip end is 45 degree or less is advantageous, and in the case of a prismatic or cylindrical shape, such thinness that the diameter of the tip end is 100 μm or less is advantageous.

In one embodiment, the electrode used in the present invention is formed of a conductive substance such as tungsten, tungsten carbide, gold, platinum, silver, copper, iron, aluminum or stainless.

In one preferred embodiment, the electric field of the present invention is generated by a set of at least two electrodes of a positive electrode and a negative electrode, and the orientation of the set of at least two electrodes is such that at least two are in different directions each other, and by controlling said electric field and a spatial arrangement of the electrodes for generating the electric field (for example, by controlling motion in the set of electrodes arranged in two different directions), the route or mode of motion can be changed. For such changing of route or mode, the following theory can be applied.

$$k\frac{d\vec{x}}{dt} = q\vec{E} + \frac{1}{2}\alpha \vec{\nabla} E^2 \qquad \text{[Mathematical formula 2]}$$

Here, $$\vec{x} \qquad \text{[Mathematical formula 3]}$$

represents a position vector of the dielectric body, which is represented by $$\vec{x}=(x_1, x_2, x_3) \qquad \text{[Mathematical formula 4]}$$

($x_1$, $x_2$, and $x_3$ are values of respective coordinates).

q represents a charge amount charging on the dielectric body, $$\vec{E} \qquad \text{[Mathematical formula 5]}$$

represents an electric field vector,

α represents an electric susceptibility, indicating the degree of polarization of the dielectric body by the electric field.

$$\vec{\nabla} \qquad \text{[Mathematical formula 6]}$$

represents an operator for conducting partial differential by the position, which is represented by $$\vec{\nabla} = \left(\frac{\partial}{\partial x_1}, \frac{\partial}{\partial x_2}, \frac{\partial}{\partial x_3}\right).$$ [Mathematical formula 7]

Here, $$\frac{\partial}{\partial x_i} (i = 1, 2, 3)$$ [Mathematical formula 8]

shows partial differential by $x_i$. [Mathematical formula 9]

E represents a value of an electric field, and is synonymous with an absolute value of an electric field vector $\vec{E}$. [Mathematical formula 10]

t represents a time.
k represents viscous resistance that the dielectric body receives from a fluid.

Here, the force acting on a charged body, and the force with which the charged dielectric body attracts or repels to an electrode is represented by the first term (i) of the right side, $q\vec{E}$. [Mathematical formula 11]

Then the force acting on the dielectric body directs from the side where the density of line of electric force is low to the side where the density of line of electric force is high, and hence the dielectric body is attracted toward the direction where the density of line of electric force is high. This is represented by the second term (ii) of the right side, $\frac{1}{2}\alpha \vec{\nabla} E^2$. [Mathematical formula 12]

When an electrode and the dielectric body contact with each other, the dielectric body is charged with an electric charge. Immediately after the dielectric body leaves the electrode, the dielectric body is charged, so that the dielectric body receives the force acting on a charged body, and the term of the above Mathematical formula 11 becomes dominant. However, as the electric charge gradually leaks and the electric charge amount charged reduces after the dielectric body leaves the electrode, the dielectric body is less likely to receive the force acting on a charged body, so that the influence of the force represented by the term of the above Mathematical formula 12 becomes dominant.

Since the directions of the forces (i) and (ii) are different from each other, the direction of motion can be determined by the balance. That is, rotational motion can be generated by the balance.

A concrete result of calculation made by determining a parameter is shown below. As shown below, it is understood that the present invention can be simulated by using the above equation of motion.

An equation of motion and an equation regarding charging and discharging of electric charge are represented as follows:

$$\frac{d\vec{x}}{dt} = q\vec{E} + \frac{1}{2}\alpha \vec{\nabla} E^2$$ [Mathematical formula 13]

$$\frac{dq}{dt} = \begin{cases} -\gamma q \\ +\beta \delta(\vec{x} - \vec{x}_0) \\ -\beta \delta(\vec{x} - \vec{x}_0) \end{cases}.$$

For ease of handling, normalization is conducted according to the definition of:

$$\vec{u} = \vec{x}/L = (u_1, u_2, u_3)$$ [Mathematical formula 14]

$$\tau = t/T$$

$$\vec{e} = \frac{4\pi\varepsilon_0 L}{\lambda} \vec{E}$$

$$z = q/Q$$

$$\vec{\nabla}_u = L\vec{\nabla} = \left(\frac{\partial}{\partial u_1}, \frac{\partial}{\partial u_2}, \frac{\partial}{\partial u_3}\right)$$

$$a_1 = \frac{\lambda QT}{4\pi\varepsilon_0 L^2 k}$$

$$a_2 = \left(\frac{\lambda}{4\pi\varepsilon_0 L^2}\right)^2 \frac{\alpha T}{k}$$

$$b_1 = \gamma T$$

$$b_2 = \beta T/Q,$$

and the equation of motion and the equation regarding charging and discharging of electric charge are summarized as follows:

$$\frac{d\vec{u}}{d\tau} = a_1 z\vec{e} + \frac{1}{2} a_2 \vec{\nabla}_u e^2$$ [Mathematical formula 15]

$$\frac{dz}{d\tau} = \begin{cases} -b_1 z \\ +b_2 \delta(\vec{x} - \vec{x}_0) \\ -b_2 \delta(\vec{x} - \vec{x}_0) \end{cases}.$$

Here, considering the case where $a_1=0.03, a_2=0.0053, b_1=8.5, b_2=50,$ [Mathematical formula 16]

and the normalized values of difference 1 in the direction parallel with the central axes of the electrodes, difference d in the perpendicular direction, and the radius of the liquid droplet $r_0$ are $l=1.2, d=0.5, r_0=0.08,$ [Mathematical formula 17]

and a program is designed in C language, using a Runge-Kutta method which is a numerical integration method of differential equation, and a simulation result as shown in FIG. 5 can be shown.

Here, (1) the dielectric body is charged with a positive electric charge from the positive electrode of the electrodes, (2) the positively charged dielectric body repels against the positive electrode by electrostatic repelling force, and comes into a separated condition from the electrode, and the positive electric charge gradually leaks, (3) then it is attracted and brought into contact with the negative electrode of the electrodes by action of a dielectric attractive force, (4) the dielectric body is charged with a negative electric charge from the negative electrode of the electrodes, and (5) electrostatic repelling force occurs between the negative electrode and the negatively charged dielectric body, and the dielectric body is separated from the electrode, and the negative electric charge gradually leaks. In this way, when the electrodes are not aligned, rotational motion of the dielectric body occurs.

In one embodiment, control of motion in the present invention is achieved, for example, by using a micromanipulator capable of manipulating each of three-dimensional coordinates by 1 μm, and manipulating each coordinate to shift an electrode to a desired position by manipulation with a means such as a finger grip, for example, or by manipulation with a hand or tweezers. This may be achieved automatically or manually. The manipulator used herein is not limited to the above size.

In one embodiment, the dielectric body can be transported by indirectly controlling the dielectric body used in the present invention by the aforementioned spatial control of the electrodes and by control of the intensity of the applied voltage. This is concretely executed in the following manner. The positive electrode and the negative electrode are arranged about 50 μm to 100 μm apart from each other in the direction parallel with the central axes and about 50 μm to 100 μm apart from each other in the direction perpendicular to the central axes, and the dielectric body is arranged between the electrodes. In this condition, a voltage of about 100 V is applied and then the dielectric body naturally starts cyclic motion.

In one specific embodiment, a micro-turbine may be used in the present invention. Here, the micro-turbine is an object of a micrometer-size (typically, several nm to 1000 μm), for example, of a size of 1 μm to 100 μm that can be fabricated by a micro-fabrication technique, and includes a rotation axis and a part of a blade which is rotatable about the rotation axis. For example, such includes a water wheel by a $SiO_2$ layer processed into a micrometer-size (for example, those used in Y. Hiratsuka, M. Miyata, T. Tada, T. Q. Uyeda, Proc. Natl. Acad. Sci. USA 103, 13618-13623 (2006) and the like). In a preferred embodiment, in the present invention, the micro-turbine may be arranged in a space where the dielectric body is movable, and work can be extracted from the micro-turbine that moves by motion of the dielectric body.

In one embodiment, there is a plurality of dielectric bodies used in the present invention, and by making these plural dielectric bodies collectively move, action of a motor is achieved. Such an example includes, but is not limited to, FIG. 7.

In this case, more work can be extracted in comparison with the case where only one dielectric body is used. For example, by arranging the aforementioned micro-turbine in the center of the collective cyclic motion of the plural dielectric bodies, it is possible to extract the work.

In various embodiments, the present invention may be used in other applications including mechanical control of a polymer, liquid droplet transportation of a pharmaceutical or chemical, a chemical reaction, pharmaceutical or chemical preparation, non-contact transportation of a biological sample, a micro-channel and the like. Here, as for the size, typically a micrometer-size (for example, several nm to 1000 μm) may be used.

For example, the present invention may be used in mechanical control of a polymer (FIG. 7). Since the technique of binding both ends of a polymer such as DNA to separate polymer beads is established, the present invention can be applied using such a technique. Since polymer beads coupled to both ends can be controlled at will by using the achievement of the present invention, the polymer can be mechanically controlled as a result.

In one embodiment, the present invention may be used in liquid droplet transportation of a pharmaceutical or chemical (FIG. 8). As is demonstrated in the present invention, a water droplet can be used in the present invention, and since production of such a water droplet is well known in the art, it is understood that transportation can be easily achieved by putting a pharmaceutical or chemical into this water drop. The present invention is used as a switching element or a variable driving device, and can be incorporated into a micro miniature distributor, pump, valve and the like that are applicable to various technical fields such as pharmacology, chemistry and biotechnology. When particularly significant miniaturization is executed as in the present invention, it is possible to shorten the time required for starting the motor to a time of a microsecond range.

In one embodiment, the present invention may be applied in a chemical reaction (FIG. 8). As is demonstrated in examples of the present invention, from the fact that a liquid droplet can be transported and transportation of a liquid droplet can be controlled, it is understood that a chemical reaction may be started in a liquid droplet by making liquid droplets under transportation into collision with each other to fuse the same.

In one embodiment, the present invention may be applied in pharmaceutical or chemical preparation (FIG. 8). Since preparation of pharmaceutical or chemicals is substantially similar to chemical reaction, as is demonstrated in examples of the present invention, by making liquid droplets under transportation collision with each other to fuse the same, mixing and the like may be executed. For example, those not desired to be mixed may be prepared in separate liquid droplets before starting of the reaction, and they may be mixed in the site where they are intended to be mixed. The present invention is outstanding in that such customized preparation can be conducted in a micrometer-size very small space.

In one embodiment, the present invention may be applied in non-contact transportation of a biological sample such as a cell, a tissue, DNA, a protein, a lipid, and a complex thereof (FIG. 8). Since a cell and a biological polymer are a kind of a dielectric body, it is understood that the technique of the present invention may be applied as is demonstrated in the present invention.

In still another embodiment, the present invention may be used in combination with a micro-channel. The micro-channel may be designed in a similar manner to the micro-turbine (FIG. 9). Therefore, it is understood that the micro-channel may have any micrometer-size. As a result, it is possible to extract larger rotational motion. Such a design may also be achieved by using the equation of motion as described above. Therefore, such a micro-channel is said to be a part of micro-techniques.

When the present invention is used in combination with a semiconductor technique, it may be used by controlling an electric field using a semiconductor device and a circuit substrate. However, this case is useful in the meaning of controlling the motion indirectly rather than directly.

Transportation Device and Work Extracting Device

In another aspect, the present invention provides an apparatus for transporting a dielectric body including A) an insulating fluid for receiving the dielectric body; and B) a means for applying an electric field including two electrodes, residing in the insulating fluid, the two electrodes being arranged so that their central axes are not aligned.

The means for applying an electric field used in the present invention may be any device as far as it has electrodes arranged in an insulating fluid and applies a voltage, and for example, a voltage of about 100 V may be applied between tungsten probe needles or between gold thin wires by using a commercially available constant voltage supply.

In other aspects, the present invention provides an apparatus for extracting mechanical work, including A) insulating fluid; B) a dielectric body arranged in the insulating fluid; C) a means for applying an electric field including two electrodes, residing in the insulating fluid, the two electrodes being arranged so that their central axes are not aligned; and D) a means for extracting mechanical work from the dielectric body.

As a means for extracting mechanical work from the dielectric body or a means for converting motion of the dielectric body into work, a propeller-like substance having a size of about 1 µm to several thousands µm may be rotated likewise a water wheel to extract work as a turbine, or a magnetized substance may be adhered to the dielectric body to indirectly control the electric field, and work may be extracted by arranging a turbine in the neighborhood.

The present invention has its significance in realizing cyclic motion which is very important, rather than simply making a liquid droplet move, and is said to be outstanding in that cyclic motion can be achieved by the feature of arranging two electrodes so that their central axes are not aligned, that is not simply anticipated in the technique as described in a conventional technique (for example, Non-Patent Document 1). It has also been demonstrated that work can be extracted by using the cyclic motion as in the preset invention. Here, as to the capability of extracting work by using cyclic motion, knowledge well known in the art may be used, and for example, in Y. Hiratsuka, M. Miyata, T. Tada, T. Q. Uyeda, Proc. Natl Acad. Sci. USA 103, 13618-13623 (2006), *Escherichia coli* is caused to cyclically move, and a micro-turbine is arranged therein, to extract the work. Similarly to this, work can be extracted from the cyclic motion of the present technique.

In various embodiments, in the apparatus of the present invention, in respect of "the central axes of two electrodes are not aligned", "dielectric body", "insulating fluid", "electrode" and the like, application may be made with reference to the items described in (Method of generating cyclic motion and its application).

In one embodiment, in the apparatus of the present invention, said dielectric body is preferably of a micrometer-size, and as to the micrometer-size (namely, the range of about several nm to 1000 µm), application may be made with reference to the items described in (Method of generating cyclic motion and its application). Preferably, the insulating fluid is provided in a container. As such a container, any container that is compatible to the insulating fluid may be used. Therefore, when a container is used, the container also constitutes a part of the apparatus. When the container is used, the container can also accommodate an electrode or a means for generating an electric field, as well as the dielectric body.

In another embodiment, the dielectric body used in the apparatus of the present invention refers to a substance that generates dielectric polarization but does not generate a current upon application of an electrostatic field, and has electrostatic chargeability, and in this respect, application may be made with reference to the items described in (Method of generating cyclic motion and its application).

In a preferred embodiment of the present invention, the water drop for use is generated by using a surfactant. In respect of the surfactant or the like, application may be made with reference to the items described in (Method of generating cyclic motion and its application).

In a preferred embodiment, the insulating fluid used in the apparatus of the present invention is a substance that is non-volatile, non-conductive, and fluent at normal temperature and normal pressure. The reason why the insulating fluid is preferably non-volatile is because it is appropriate for long-term transportation and movement of the dielectric body, and it is appropriate not to inhibit transportation and movement of the dielectric body by the convection of a liquid by evaporation. Preferably, non-volatility of such a degree that only 0.1% or less in volume of volatilization is observed per a day at normal temperature and normal pressure is advantageous. The reason why the insulating fluid of the present invention is preferably non-conductive is because the intensity of the electric field acting on the dielectric body can be ensured, and the efficiency of charging to the electric charge of the dielectric body is improved. Further, the specific gravity of the insulating fluid of the present invention is preferably within ±50% with respect to the specific gravity of the dielectric body used in the present invention. In these respects, and as to the insulating fluid that may be used, application may be made with reference to the items described in (Method of generating cyclic motion and its application).

Preferably, the electric field used in the present invention is a constant electric field. The present invention is outstanding in that it can be equally used in a constant electric field, and dynamic motions like periodic motion and rotational motion such as transportation and extraction of work can be achieved.

A means capable of generating a constant electric field used in the present invention includes, for example, a method applying a voltage of about 100 V between tungsten probe needles or between gold thin wires by using a commercially available constant voltage supply. In this respect, application may be made with reference to the items described in (Method of generating cyclic motion and its application).

The electric field used in the apparatus of the present invention is subject to the range from 1V to 1000V, and preferably ranges from 5V to 50V, from 50V to 500V, or from 10V to 100V, and it is understood that an appropriate range varies depending on the dielectric body being used and the arrangement of the electrodes. In this respect, application may be made with reference to the items described in (Method of generating cyclic motion and its application).

Preferably, the positive electrode and the negative electrode for generating an electric field used in the present invention are arranged asymmetrically so that their central axes are not aligned. In this respect, application may be made with reference to the items described in (Method of generating cyclic motion and its application).

In a preferred embodiment, the electrode used in the present invention has a pyramid or conical shape having a sharp tip, or a prismatic or cylindrical shape, and has a conductive material. In this respect and as to a concrete material or the like, application may be made with reference to the items described in (Method of generating cyclic motion and its application).

In one embodiment, the means for applying an electric field used in the apparatus of the present invention is a set of at least two electrodes of a positive electrode and a negative electrode, and the set of at least two electrodes are arranged so that at least two are in directions different from each other. In this respect and as to a concrete material or the like, application may be made with reference to the items described in (Method of generating cyclic motion and its application).

In one embodiment, the apparatus of the present invention further includes a means for transporting a dielectric body by arranging an objective dielectric body between the positive electrode and the negative electrode that are arranged about 50 µm to 100 µm apart from each other in the direction parallel with the central axes and about 50 µm to 100 µm apart from each other in the direction perpendicular to the central axes, applying, in this condition, a voltage of about 100 V, and controlling the distance between the electrodes and the applied voltage. In this respect and as to a concrete material or the like, application may be made with reference to the items described in (Method of generating cyclic motion and its application).

In another embodiment, the apparatus of the present invention further includes a micromanipulator capable of manipulating each of three-dimensional coordinates by 1 μm, the micromanipulator manipulating each coordinate to shift an electrode to a desired position, or further includes tweezers. Here, manipulation of the coordinate may be realized with a finger grip. In this respect and as to a concrete material or the like, application may be made with reference to the items described in (Method of generating cyclic motion and its application).

In one preferred embodiment, the apparatus of the present invention further includes a micro-turbine. An example of a water wheel by a $SiO_2$ layer processed into a micrometer-size includes those used in Y. Hiratsuka, M. Miyata, T. Tada, T. Q. Uyeda, Proc. Natl. Acad. Sci. USA 103, 13618-13623 (2006) and the like. In this respect and as to a concrete material or the like, application may be made with reference to the items described in (Method of generating cyclic motion and its application).

In another embodiment, in the apparatus of the present invention, there is a plurality of dielectric bodies, and by making the plural dielectric bodies collectively move, action of a motor is achieved. In this respect and as to a concrete material or the like, application may be made with reference to the items described in (Method of generating cyclic motion and its application).

In various embodiments, the apparatus of the present invention may have the following applications: mechanical control of a polymer, liquid droplet transportation of a pharmaceutical or chemical, a chemical reaction, pharmaceutical or chemical preparation, non-contact transportation of a biological sample, and a micro-channel. In this respect and as to a concrete material or the like, application may be made with reference to the items described in (Method of generating cyclic motion and its application).

Reference documents such as science literatures, patents, patent applications and the like cited in the present specification are incorporated in their entireties by reference in the present specification to such an extent that they are concretely described.

In the above, the present invention has been described while indicating preferred embodiments for better understanding. In the following, the present invention will be described based on examples, and it is to be noted that the above description and the following examples are provided exclusively for the purpose of exemplification, and not for limiting the present invention. Therefore, the scope of the present invention is restricted only by claims, without limited by the embodiments and examples concretely described in the present specification.

EXAMPLES

In the following, the present invention will be described more specifically by way of examples, however the technical scope of the present invention is not limited by these examples and the like. Reagents used below are commercially available reagents unless otherwise specified.
(Experiment Outline)

Figure 1C:
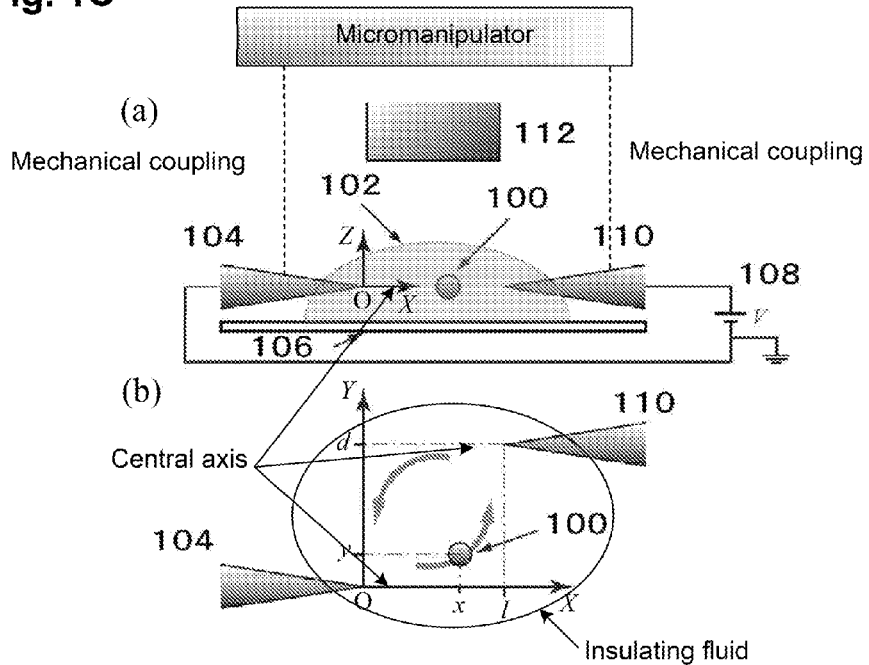
FIG. 1C(a) is a lateral view of an experimental setting. Mineral oil containing a water droplet is arranged on a glass slide, and an electrode was inserted into the mineral oil. By using a microscope, the experiment was observed from above. V is a constant voltage applied between the electrodes. The X-Z coordinate is a vertical plane. O (origin) is a vertex of a negative electrode.

FIG. 1C shows a schematic view of an experimental setup. By suspending a water drop in mineral oil on the glass slide, and using a conical tungsten electrode, a constant voltage was applied to the liquid droplet (FIG. 1C(a)). These electrodes were arranged at the same height (FIG. 1C(a)) and arranged non-coaxially (FIG. 1C(b)). Motion of the liquid droplet was observed by using a light microscope (VH-Z75, available from KEYENCE Japan).

Example 1

In this example, whether rotational motion occurs was demonstrated using a positive electrode and a negative electrode, and oil as an insulating fluid and a water droplet as a dielectric body. The material and method are as follows:
(Material and Method)
(As to FIG. 2)
Positive electrode: made of tungsten (available from NPS co., LTD.)
Negative electrode: made of tungsten (available from NPS co., LTD.)
Oil: mineral oil (available from Nacalai Tesque) Water droplet: prepared by phospholipid DOPC (available from Wako Pure Chemical Industries, Ltd.)
Arrangement of electrodes: the positive electrode and the negative electrode were arranged 50 μm apart from each other both in the direction parallel with the central axes and in the direction perpendicular to the central axes.
Mode of application of voltage: 100 V as a constant voltage
(As to FIG. 3)
Positive electrode: made of tungsten carbide (available from NPS co., LTD.)
Negative electrode: made of tungsten carbide (available from NPS co., LTD.)
Oil: mineral oil (available from Nacalai Tesque)
Water droplet: prepared by phospholipid DOPC (available from Wako Pure Chemical Industries, Ltd.)
Arrangement of electrodes (left): 120 μm in the direction parallel with the central axes, and 0 μm in the perpendicular direction
Arrangement of electrodes (center): 120 μm in the direction parallel with the central axes, and 40 μm in the perpendicular direction
Arrangement of electrodes (right): 120 μm in the direction parallel with the central axes, and 120 μm in the perpendicular direction
Mode of application of voltage: 120 V for left, center and right
(Experiment)
(Preparation of Liquid Droplet<Common to FIG. 2 and FIG. 3>)
Using a vortex mixer, a w/o micro-droplet was generated. Mineral oil containing a surfactant was prepared. Then, 10 μM surfactant (DOPC, dioleoyl phosphatidylcholine) (available from Wako Pure Chemical Industries, Ltd., Japan) was dissolved in mineral oil (available from Nacalai Tesque, Japan) over 90 minutes under an acoustic wave, while the temperature was kept at 50° C. Then, 2 μL of ultrapure water (available from Millipore, Japan) was added to 200 μL of mineral oil prepared, and mixed for about 3 seconds with a vortex mixer. More specifically, the following procedure was used.

A Durham tube (available from Maruemu Corporation) or a microtube (available from ASSIST) having a capacity of 1.5 mL or more is prepared.

A solution of 1 mM surfactant DOPC dissolved in a 2:1 (volume ratio) mixed organic solvent of chloroform (available from Nacalai Tesque) and methanol (available from Nacalai Tesque) as a solvent is prepared, and 10 μL of the solution is injected into the above container.

Nitrogen gas is blown to the injected solution, and the solution is dried until the organic solvent completely disappeared, to leave a thin film of DOPC on the bottom of the container.

To the above is injected 1000 μL of mineral oil (available from Nacalai Tesque).

Using an incubator equipped with an ultrasonic generator (sonicator) (Model US-1KS, available from SND Co., Ltd.), DOPC is dissolved well in mineral oil by applying an ultrasonic wave (90 minutes) to the solution while keeping the solution at 50° C.

The solution thus prepared is desirably used in 12 hours.

Then, 200 μL of this solution is taken, and transferred to another container, and added with 1.75 μL of MilliQ water.

This solution is stirred using a vortex, and mixed spherical droplets having various sizes of 1 μm to 100 μm in diameter are formed in the solution.

The operation is similar when a surfactant other than DOPC is used, however, the concentration can vary depending on the substance.

(Transportation of Droplet by Constant Electric Field)

About 202 μL of the above solution in which liquid droplets are formed is transferred onto a glass slide. At this time, use of a glass slide coated with silicon facilitates the experiment; however, it is not limited thereto.

The glass slide is set on a microscope.

Two tungsten carbide electrodes having a tip end radius of 5 μm are prepared. As the tip end radius, about 1 μm to 100 μm can be widely used. The electrodes may be made of any material having conductivity (gold, platinum, silver, copper, iron, aluminum, tungsten, tungsten carbide and the like).

Both electrodes and a constant voltage power supply device are connected in circuit, to make one of the electrodes a positive electrode, the other a negative electrode.

Both electrodes are dipped in the liquid on the preparation. At this time, they are kept 30 μm or more apart from both the bottom of the liquid and the interface between the liquid and the air.

The electrodes are arranged in such a manner that the central axes of the electrodes are parallel so that the tip ends of the electrodes are opposed to each other. The arrangement is made so that the tip ends are 100 to 120 μm apart from each other in the direction parallel with the axis, and are 50 to 100 μm apart from each other in the direction perpendicular to the axis.

A movable stage of the microscope is adjusted so that a liquid droplet of 10 to 20 μm comes near between these tip ends.

The constant voltage power supply device is turned on and a constant voltage is applied between the electrodes. As the voltage, any voltage within the range of 100V to 120V is applicable.

(Result)

As described in FIG. 2, FIG. 2A and FIG. 3, appearances of transportation and spatial periodic motion of a micro-object by a constant electric field are shown. In this example, cyclic motion was caused to occur in a micrometer-sized water droplet in oil.

The left view of FIG. 2 shows the state where the electrodes and a water droplet are in an oil liquid. The water droplet is emulsified by a surfactant, and is floating in oil. When a constant voltage is applied in this state, the water droplet starts cyclic motion as shown on the right of FIG. 2. In this example, DC 100V is applied as a constant voltage. When the voltage is too low, a motion mode going back and forth between the electrodes fails to appear, but a motion mode fluctuating near either one of the electrodes appears. When the voltage is enhanced, a linear motion mode going back and forth linearly between the electrodes appears rather than cyclic motion.

In FIG. 2, the left view describes a scene of setup of an experiment, and the right view shows a composite picture obtained by superposing sequentially imaged snapshots of one water droplet that is making cyclic motion. This motion will be better understood by means of a moving image (electrode: made of tungsten, surfactant: phospholipid DOPC).

Motion of the water droplet is shown in the snapshot images on the left of FIG. 2A(a) to FIG. 2A(d). When the applied voltage was low (V=20V, FIG. 2A(a)), the liquid droplet fluctuated, and escaped from trapping force of the dielectric body (mode I). When the applied voltage exceeded a critical voltage, the liquid droplet started cyclic motion (FIG. 2A(b) to FIG. 2A(d)). First, the liquid droplet was attracted to a vertex of either one of the electrodes, and then repelled against one of the electrodes and moved to the opposite electrode. This motion persisted. The motion of the liquid droplet described a one-directional circular track which is independent of the initial position of the liquid droplet. That is, the track of the rotational motion was a kind of limit cycle. This rotational motion was observed not only for one water drop, but also for two or more liquid droplets. From the data of rotational motion of two water droplets, actual motion is recognized.

In the experiment, two types of rotational motions, namely, simple rotational motion (mode II) and rotational motion accompanied by bounding on the electrode (mode III) were observed. These behaviors were changed over depending on the applied voltage. In 60V and 120V (FIG. 2A(b) and FIG. 2A(c)), the liquid droplet made simple rotational motion between the electrodes (mode II). As shown by the graph of time-dependent data in the center and the spectrum of Fourier transform on the right in FIG. 2A(b) and FIG. 2A(c), the speed of the rotational motion increased with the applied voltage. When the applied voltage was 160V, the liquid droplet made fast rotational motion (FIG. 2A(d)). In this case, as shown by fluctuation in the time-dependent data, the liquid droplet constantly bounded several times when the liquid droplet came into contact with either electrode (mode III).

FIG. 3 is a superposition of snapshots in another experimental example. In this experiment, the arrangement of electrodes is varied, and the left view shows the case where the electrodes are arranged 120 μm apart in the direction parallel with the central axes and aligned (that is, 0 μm in the direction perpendicular to the central axes), and the center and right views show the cases where the electrodes are arranged 120 μm apart in the direction parallel with the central axes and 40 μm apart in the perpendicular direction, and 120 μm apart in the direction parallel with the central axes and 120 μm apart in the perpendicular direction, respectively (electrode: made of tungsten carbide, surfactant: phospholipid DOPC).

As shown in the left view of FIG. 3, only simple periodic motion can be extracted when the electrodes are aligned (similar condition to that of Non-Patent Document 1), however, when the electrodes are arranged so that they are not aligned as shown in the center view of FIG. 3 or the right view of FIG. 3, it is possible to extract cyclic motion since the state using both the force acting on a charged body (see FIG. 4(*i*)) and the dielectric force (see FIG. 4(*ii*)) among the forces acting on the dielectric body can be realized. Whether or not such a state is realizable is not obvious in a textbook level, and hence it can be said to be a novel technical matter.

Example 2

Material of Dielectric Body

In the present example, it is shown that various conditions were examined and as a result, the following features were revealed. The basic experimental technique was conducted according to Example 1.

Material of Dielectric Body

In the present example, it was confirmed that the dielectric body may be of any material, and confirmed that a movable polyethylene bead, glass bead or the like besides the water micro-droplet also makes similar motion.

Example 3

Material of Electrode

In the present example, it is shown that various conditions were examined and as a result, the following features were revealed. The basic experimental technique was conducted according to Example 1.

In the present example, it was confirmed that the material of the electrode is irrelevant (only conductivity is required). That is, this was confirmed by tungsten, tungsten carbide and gold. FIG. 3 is an example of tungsten, and FIG. 4 is an example of tungsten carbide. A similar effect was confirmed by gold.

Example 4

Surfactant for Generation of Water Droplet

In the present example, it is shown that various conditions were examined and as a result, the following features were revealed. The basic experimental technique was conducted according to Example 1.

In the present example, it was confirmed that any surfactant may be used for generation of a water droplet, and that DOPC, DOPE, DOPS and the like also function. It was also confirmed that a surfactant is not required in the case of a polyethylene bead, glass bead or the like.

Example 5

Range of Working Voltage

In the present example, it is shown that various conditions were examined and as a result, the following features were revealed. The basic experimental technique was conducted according to Example 1.

In the present example, it was demonstrated that the range of the working voltage is wide. It was demonstrated in the range of several volts to several hundred volts.

Example 6

Simulation

In the present example, for examining whether the principle of the present invention can be explained by a general physical theory, a physical model (equation of motion) and a simulation result are shown (FIG. 4 and FIG. 5).

In this system, two forces acting on a micrometer-sized object: (i) force acting on a charged body and (ii) force acting on a dielectric body, play important roles. A micrometer-sized dielectric body is charged with an electric charge (charged) by contact with an electrode. It is charged positively by contact with a positive electrode, and charged negatively by contact with a negative electrode.

As a result, the dielectric body behaves also as a charged body, and is influenced by electrostatic attracting force and repelling force (force of (i) in FIG. 4, electrophoresis). As the dielectric body leaves from the electrode, the electric charge is naturally and gradually discharged, and the behavior as the dielectric body becomes dominant to the behavior as the charged body. Generally, a dielectric body has a nature of being attracted to the direction in which the density of line of electric force is high (force of (ii) in FIG. 4, dielectrophoresis). Since the directions of these two forces are not parallel, the direction of motion is determined by the balance of both directions.

This simulation result was calculated using the following model.

An equation of motion and an equation regarding charging and discharging of electric charge are respectively shown as follows:

$$\frac{d\vec{x}}{dt} = q\vec{E} + \frac{1}{2}\alpha \vec{\nabla} E^2 \qquad \text{[Mathematical formula 18]}$$

$$\frac{dq}{dt} = \begin{cases} -\gamma q \\ +\beta \delta(\vec{x}-\vec{x}_0) \\ -\beta \delta(\vec{x}-\vec{x}_0) \end{cases}.$$

For ease of handling, normalization is conducted according to the definition of:

$$\vec{u} = \vec{x}/L = (u_1, u_2, u_3) \qquad \text{[Mathematical formula 19]}$$

$$\tau = t/T$$

$$\vec{e} = \frac{4\pi\varepsilon_0 L}{\lambda}\vec{E}$$

$$z = q/Q$$

$$\vec{\nabla}_u = L\vec{\nabla} = \left(\frac{\partial}{\partial u_1}, \frac{\partial}{\partial u_2}, \frac{\partial}{\partial u_3}\right)$$

$$a_1 = \frac{\lambda Q T}{4\pi\varepsilon_0 L^2 k}$$

$$a_2 = \left(\frac{\lambda}{4\pi\varepsilon_0 L^2}\right)^2 \frac{\alpha T}{k}$$

$$b_1 = \gamma T$$

$$b_2 = \beta T/Q,$$

and the equation of motion and the equation regarding charging and discharging of electric charge are summarized as follows:

$$\frac{d\vec{u}}{d\tau} = a_1 z \vec{e} + \frac{1}{2}a_2 \vec{\nabla}_u e^2 \qquad \text{[Mathematical formula 20]}$$

$$\frac{dz}{d\tau} = \begin{cases} -b_1 z \\ +b_2 \delta(\vec{x}-\vec{x}_0) \\ -b_2 \delta(\vec{x}-\vec{x}_0) \end{cases}.$$

Here, considering the case where $a_1=0.03, a_2=0.0053, b_1=8.5, b_2=50,$ [Mathematical formula 21]

and the normalized values of difference 1 in the direction parallel with the central axes of the electrodes, difference in the perpendicular direction, and the radius of the liquid droplet $r_0$ are $l=1.2, d=0.5, r_0=0.08,$ [Mathematical formula 22]

and a program is designed in C language, using a Runge-Kutta method which is a numerical integration method of differential equation, and a simulation result as shown in FIG. 5 can be shown.

Here, (1) the dielectric body is charged with a positive electric charge from the positive electrode of the electrodes, (2) the positively charged dielectric body repels against the positive electrode by electrostatic repelling force, and comes into a separated condition from the electrode, and the positive electric charge gradually leaks, (3) then it is attracted and brought into contact with the negative electrode of the electrodes by action of a dielectric attractive force, (4) the dielectric body is charged with a negative electric charge from the negative electrode of the electrodes, and (5) electrostatic repelling force occurs between the negative electrode and the negatively charged dielectric body, and the dielectric body is separated from the electrode, and the negative electric charge gradually leaks. In this way, when the electrodes are not aligned, rotational motion of the dielectric body occurs.

Example 7

Dependency of Rotational Motion on Applied Voltage

In the present example, dependency of the rotational motion on the applied voltage was demonstrated (FIG. 5A(a) to FIG. 5A(f)).

As shown in FIG. 1C and FIG. 2A, a liquid droplet was arranged between electrodes, a voltage was applied, rotational motion of the liquid droplet was measured, the graph as shown in FIG. 2A was made, and frequency of rotation was measured. FIG. 5A shows frequency recorded for each voltage varied by 20 V from 0 V to 160 V. FIG. 5A(a) to FIG. 5A(f) show examples wherein diameter of the liquid droplet is (a) 14.0 μm, (b) 17.1 μm, (c) 18.8 μm, (d) 19.5 μm, (e) 31.8 μm, and (f) 34.6 μm, respectively.

The frequency increased from about 0.1 Hz to about 0.8 Hz according to the applied voltage (about 40 to 160 V). When the voltage exceeded about 80 V, the liquid droplet made rotational motion accompanied by bounding on the electrode (mode III). At about 40 to 80 V, the liquid droplet made simple rotational motion (mode II). However, at a much lower voltage (about 20 to 40 V), the liquid droplet failed to make rotational motion (mode I). This is plotted as 0 Hz. The behavior of the liquid droplet depending on the voltage was schematically shown as a phase diagram (FIG. 5A(g)).

A model describing rotational motion of a w/o microdroplet is proposed. In an equation of motion in the scale of nanometer to micrometer, the term of viscous force is dominant to the term of inertial force. This is because the Reynolds number $R_e$ is very small. That is, $R_e=\rho v r/\eta \sim 10^{-3} \ll 1.$ [Mathematical formula 23]

Here, $\rho$(to $10^3$ kg/m$^3$) and $\eta$(to $10^3$ Pa·s) respectively represent density and viscosity of mineral oil, and v(to $10^{-4}$ m/s) and r(to $10^{-5}$ m) respectively represent speed and diameter of a water droplet. Therefore, in a constant electric field $E,$ [Mathematical formula 24]

an equation of motion of overdamping is given by

[Mathematical formula 25]

$$k\dot{x}=qE+\tfrac{1}{2}\alpha\nabla|E|^2, \quad (1)$$

Here, k (=6 $\pi\eta r$ to $10^{-7}$ kg/s) is a coefficient of viscous resistance, and $k\dot{x}$ [Mathematical formula 26]

represents viscous resistance for moving the liquid droplet at diameter r and rate $\dot{x}.$ [Mathematical formula 27]

$qE$ [Mathematical formula 28]

and $(\tfrac{1}{2})\alpha\nabla|E|^2$ [Mathematical formula 29]

represent electric force and dielectric force acting on the liquid droplet at electric charge q and polarizability $\alpha$(to $10^{-30}$ C·m$^2$/V).

FIG. 5A(a) to FIG. 5A(f) show dependency of frequency of rotational motion on the applied voltage. In FIG. 5A(a), r=14.0 μm, in FIG. 5A(b), r=17.1 μm, in FIG. 5A(c), r=18.8 μm, in FIG. 5A(d), r=19.5 μm, in FIG. 5A(e), r=31.8 μm, and in FIG. 5A(f), r=34.6 μm. Regions (I) to (III) correspond to motion modes in the phase diagram in FIG. 5A(g). FIG. 5A(g) shows motion of a liquid droplet depending on the applied voltage. Here, in FIG. 5A(g), G1 represents (mode I) non-rotational motion, G2 represents (mode II) rotational motion, and G3 represents (mode III) rotational motion accompanied by bounding on the electrode.

For showing a track of limit cycle, dissipation of energy is required. In the case of rotational motion of a liquid droplet, the process of charging and discharging of the liquid droplet is considered to play a certain role in dissipation of energy. For simplification, it is assumed that the rate of electric charge q depending on time is described as follows:

[Mathematical formula 30]

$$\dot{q} = \begin{cases} +a \text{(on positive electrode)} \\ -a \text{(on negative electrode)} \\ -bq \text{(in other regions)} \end{cases} \quad (2)$$

This means that the liquid droplet is charged at a speed of $\pm a$ near the positive/negative electrode, and discharged at a speed of $-bq$ in the absence of an electrode.

FIG. 2A(e) shows results of numerical simulation calculated using the formulas (1) and (2). The constant electric field and the numerical parameters used in the simulation of FIG. 2A(e) are as follows.

Here, it is assumed that the constant electric field used herein can be expressed by:

$E=(Ex,Ey),$ [Mathematical formula 30A]

and is assumed to be expressed by the following function of a droplet:

$x=(x,y).$ [Mathematical formula 30B1]

Then, calculation may be conducted as follows:

[Mathematical formula 30C]

-continued $$Ex = -\frac{V}{\lambda}\left[\frac{1}{\sqrt{(x/\lambda)^2 + (y/\lambda)^2}} + \frac{1}{\sqrt{((x-l)/\lambda)^2 + ((y-d)/\lambda)^2}}\right], \quad (1)$$

$$Ey = \frac{V}{\lambda}\left[-\frac{y/\lambda}{\sqrt{(x/\lambda)^2 + (y/\lambda)^2}\left(\sqrt{(x/\lambda)^2 + (y/\lambda)^2} + x/\lambda\right)} + \right. \quad (2)$$

$$\left.\frac{(y-d)/\lambda}{\sqrt{((x-l)/\lambda)^2 + ((y-d)/\lambda)^2}\left(\sqrt{((x-l)/\lambda)^2 + ((y-d)/\lambda)^2} - (x-l)/\lambda\right)}\right]. \quad (3)$$

Here, $$\lambda(=l=d) \qquad \text{[Mathematical formula 30D]}$$

represents a normalization coefficient of a length unit, $$V \qquad \text{[Mathematical formula 30E]}$$

represents an applied voltage. Here, it is assumed that the droplet cannot approach the electrode closer than the distance of $$r_1, \qquad \text{[Mathematical formula 30F]}$$

and it is assumed that the droplet is charged when the droplet approaches the electrode within the distance:

$$r_2. \qquad \text{[Mathematical formula 30G]}$$

The parameters used are as follows:

$$V=200\ V,\ \lambda=l=d=100\times10^{-6}\ m,\ r_1=0.075l \qquad \text{[Mathematical formula 30H]}$$

and $$r_2=0.2\lambda. \qquad \text{[Mathematical formula 30I]}$$

The parameters of the formula (2) are as follows:

$$a=1\times10^{-13}\ C/s \qquad \text{[Mathematical formula 30J]}$$

and $$b=2.5\ s^{-1}. \qquad \text{[Mathematical formula 30K]}$$

Initial conditions of $$x=(x,y) \qquad \text{[Mathematical formula 30L]}$$

and $$q \qquad \text{[Mathematical formula 30M]}$$

are as follows:

$$x_0=0.2l,\ y_0=0.5d \qquad \text{[Mathematical formula 30N]}$$

and $$q_0=0. \qquad \text{[Mathematical formula 30O]}$$

The track of the liquid droplet in the simulation is one-directional rotational motion, and this coincides with the experimental result. The frequency also corresponds to the tendency of the experiment.

Dependency of the rotational motion on the applied voltage can be explained by using this model.

$$|E|\propto V \text{ and } f\sim|\dot{x}|/L \qquad \text{[Mathematical formula 31]}$$

l and
is established. Here, f represents frequency of rotational motion, and L represents circumferential length. Therefore, from the formula (1), dependency of f on V can be derived as follows:

$$f\sim c_1 V + c_2 V^2, \qquad \text{[Mathematical formula 32]}$$

Here, $c_1$ and $c_2$ are proportionality coefficients. The formula (3) means that the frequency increases with the applied voltage as is observed in FIG. 3(a) to FIG. 3(f).

(Discussion)

In summary, the mechanism of the observed rotational motion can be explained as follows. First, a liquid droplet is attracted to a vertex of either electrode by dielectric force. After charged near the electrode, the liquid droplet is repelled by the electrode by electrostatic repulsive force, and starts moving toward the electrode on the opposite side by electric force. During this motion toward the electrode on the opposite side, the liquid droplet substantially discharges to a bulk oil phase. By contribution of dielectric potential, the liquid droplet is attracted again to the electrode on the opposite side. Changeover between electric force and dielectric force caused by dissipation of electric charge leads one-directional rotational motion. This is because electric force and electrostatic force generally do not have the same direction. Therefore, the arrangement of the two electrodes is important for generating rotational motion. For example, as shown in the previous work made by the present inventors [Non-Patent Document 1], in a linear arrangement, a liquid droplet fails to make rotational motion. In addition, rotational motion does not occur exclusively in a w/o micro-droplet. As shown by the model demonstrated in the present example, theoretically, any dielectric body object can make rotational motion in the present system.

Basically, in nanometer to micrometer scales, it is difficult to generate one-directional mechanical motion. This is because the Reynolds number is very low, and the environmental viscous force is dominant to the inertial force. Therefore, there is a limit to downsize a conventional rotary motor. That is, since a motor typically has its rotation axis in the center of a reel, an abrasion force resulting from the environmental viscous force suppresses rotational motion of the motor. As the size of the rotary motor decreases, the suppressing effect resulting from the abrasion significantly increases. The rotational motion observed in the present invention can be important in development of a non-contact rotary motor capable of extracting work and energy in nanometer to micrometer scales [E. M. Purcell, Am. J. Phys. 45, 3(1977).] and [Y. Hiratsuka, M. Miyata, T. Tada, and T. Q. P. Uyeda, Proc. Natl. Acad. Sci. USA 103, 13618 (2006)]. The results of the examples in the present invention are expected to stimulate the development in a micromechanical system under a novel strategy.

Example 8

Concrete Application Example

As a transportation technique of a micrometer-sized object, a laser tweezers method or a micro-channel technique are considered, however, in comparison with these techniques, a method based on a constant electric field is very simple, and has great evolvability by combination with a semiconductor circuit technique. Also it may be further developed by combination with an existent microtechnology. In the following, application examples are shown in FIG. 6 to FIG. 9.

(Example of Transportation at Will; FIG. 6)

The electrode may be made of any material such as tungsten, tungsten carbide, gold, platinum, iron or the like. The arrangement may be made at an interval of about 10 to 100 μμm.

(Extraction of Work Using Micro-Turbine; FIG. 6)

As a micro-turbine, PDMS or a film for micro resist SAL601 (Shipley Microelectronics) that is often used in a micro-processing technique may be used.

(Motor by Collective Motion of Micrometer-Sized Dielectric Bodies; FIG. 7)

As a micrometer-sized dielectric body, a water droplet, a polymeric substance (for example, a polyethylene bead, PDMS, a polyacrylamide gel), a glass bead and the like may be arranged between electrode setup of tungsten, tungsten carbide and the like in a similar manner to examples, and a voltage may be applied.

(Mechanical Control of Polymer; FIG. 7)

As a polymer, both ends of DNA, protein or the like are bound to polystyrene beads or the like, and arranged between electrode setup of tungsten, tungsten carbide and the like in a similar manner to examples, and a voltage may be applied.

(Transportation of Liquid Droplet Such as Pharmaceutical or Chemical; FIG. 8)

An arbitrary pharmaceutical or chemical may be put into a water droplet using a surfactant in a similar manner to the above examples, and arranged between electrode setup of tungsten, tungsten carbide and the like, and a voltage may be applied.

With these constitutions, it is possible to achieve one avoiding waste of a liquid, realizing a low cost, and having the nature of a micro chemical system as well.

(Chemical Reaction by Fusion of Liquid Droplets; FIG. 8)

As an example,

Pharmaceutical/Chemical A: aqueous acetic acid solution

Pharmaceutical/Chemical B: aqueous sodium hydroxide solution

Chemical reaction: Neutralization using A and B can be executed.

This can be practiced by preparing Chemicals A and B by the water droplet preparation method as described above, arranging them between electrodes of tungsten, tungsten carbide and the like, and applying a voltage.

With these constitutions, it is possible to achieve one avoiding waste of a liquid, realizing a low cost, and having the nature of a micro chemical system as well.

(Pharmaceutical or Chemical Preparation by Fusion of Liquid Droplets; FIG. 8)

By containing a plurality of antibiotics, analgesics and the like in a liquid droplet, and making them fuse together, a pharmaceutical or chemical can be prepared. With these constitutions, it is possible to achieve one avoiding waste of a liquid, realizing a low cost, and having the nature of a micro chemical system as well.

(Non-Contact Transportation of Biological Sample; FIG. 8)

As a biological sample, a bacterium such as *Escherichia coli*, a cell, a tissue section or the like may be arranged between electrodes of tungsten, tungsten carbide and the like, and a voltage may be applied. That is, a cell, bacterium or the like is included in a liquid droplet, and application such as transportation or separation (sorting) depending on the nature of the cell included therein can be executed by using the motion realized by the present invention. As to the sorting, it can be realized by combination with the technique such as laser tweezers, for example. It is also possible to branch the destination of the liquid droplet by combining with MEMS, a micro-channel and the like.

With this constitution, a biological sample such as a cell that will be damaged by a contact can be transported in a non-contact manner, so that an experimental system that is not conventionally known can be realized. In this way, it is possible to realize individual transportation and separation of bacterium such as *Escherichia coli*, a cell, a tissue section and the like.

(Extraction of Larger Rotational Motion by Combination with Micro-Channel; FIG. 9)

As a micro-channel, it may be arranged between electrodes of tungsten, tungsten carbide and the like in a circular micro-channel prepared by a micro-fabrication technique, an arbitrary dielectric body may be introduced into the channel, and a voltage may be applied.

(Liquid Delivery and Stirring in Micro Chemical Reaction System)

Using the present invention, in a micro chemical reaction system, a reaction solution, a test species, a reagent or the like may be put into a liquid droplet, and the liquid droplet may be delivered or stirred by using the inventive motion.

(Liquid Delivery and Stirring in Micro Clinical Test System)

Using the present invention, in a micro clinical test system, a reaction solution, a test species, a reagent or the like may be put into a liquid droplet, and the liquid droplet may be delivered or stirred by using the inventive motion.

Applied Examples

The present invention may be applied by reference to the following examples. For example, such includes optical tweezers [D. G. Grier, Nature 424, 810 (2003)], electrophoresis and dielectrophoresis [J. Voldman, Annu Rev. Biomed. Eng. 8, 425 (2006); P. Tabeling, Introduction to Microfluidics (Oxford University Press, 2006); T. B. Jones, Electromechanics of Particles (Cambridge University Press, 1995)], microfluidic device [P. Tabeling, Introduction to Microfluidics (Oxford University Press, 2006); D. R. Link, E. Grasland-Mongrain, A. Duni, F. Sarrazin, Z. Cheng, G. Cristobal, M. Marquez, and D. A. Weitz, Angew. Chem. Int. Ed. Engl. 45, 2556 (2006); S. Teh, R. Lin, L. Hung, and A. Lee, Lab Chip 8, 198 (2008)], bacteria driving motor [Y. Hiratsuka, M. Miyata, T. Tada, and T. Q. P. Uyeda, Proc. Natl. Acad. Sci. USA 103, 13618 (2006); B. Behkam and M. Sitti, Appl. Phys. Lett. 90, 023902 (2007)], motor protein [S. Hiyama, R. Gojo, T. Shima, S. Takeuchi, and K. Sutoh, Nano Lett. 9, 2407(2009); M. G. L. van den Heuvel and C. Dekker, Science 317, 333 (2007)] and the like.

As described above, while the present invention has been exemplified by way of preferred embodiments of the present invention, the present invention should not be interpreted limitedly from these embodiments. It is understood that the scope of the present invention is interpreted only by claims. It is understood that a person skilled in the art is able to practice an equivalent range based on the description of the present invention and technical common knowledge from the description of concrete preferred embodiments of the present invention. It is understood that the patents, patent applications, and documents cited in the present specification should be incorporated by reference in the present specification to such an extent that their contents are concretely described in the present specification.

INDUSTRIAL APPLICABILITY

From the above, the present invention has succeeded in making a micrometer-sized dielectric body generate mechanical motion by applying a constant electric field. Therefore, the present invention has provided rotary-motor-like motion, and achieved capability of generating oscillatory and periodic motion not in an AC electric field. Also the present invention has achieved that the route of motion and the mode of motion can be changed at will by intensity of the electric field and a spatial arrangement of the electrodes rather than by the motion of a current because a current does not occur. Additionally, the point that motor-like motion can be extracted without contact in a constant electric field is important, and it has revealed that an object can be transported in a non-contact manner. Therefore, the present invention can be used in a variety of fields including mechanical control of a polymer, liquid droplet transportation of a pharmaceutical or chemical, a chemical reaction, pharmaceutical or chemical preparation, non-contact transportation of a biological sample, a micro-channel and the like.

EXPLANATION OF REFERENCE NUMERALS

| | |
|---|---|
| 100 | water droplet |
| 102 | mineral oil |
| 104 | negative electrode |
| 106 | glass slide |
| 108 | constant voltage |
| 110 | positive electrode |
| 112 | objective lens of microscope |
| 210 | droplet |
| 212 | electrode |
| 215 | electrode |
| 221 | starting point |
| 600 | micrometer-sized dielectric body |
| 602, 604, 606, 608, 612, 614 | electrode |
| 610 | micro-turbine |
| 700 | micrometer-sized dielectric body |
| 710 | polymer |
| 702, 704, 712, 714, 716, 718 | electrode |
| 800 | liquid droplet |
| 802, 804, 806, 808, 812, 814, 816, 818 | electrode |
| 810 | biological sample |
| 900 | circular micro-channel |
| 902, 904 | electrode |

The invention claimed is:

1. An apparatus for transporting a dielectric body comprising:
an insulating fluid for receiving the dielectric body, the insulating fluid being of different composition to the dielectric body;
two electrodes; and
a means for applying a constant voltage between the two electrodes to generate a constant electric field, the two electrodes residing in the insulating fluid, the two electrodes having central axes, the central axes running along the center of their respective electrodes and being parallel to the direction of the maximum length of their respective electrodes, the two electrodes being arranged so that their central axes are sufficiently not aligned such that when the constant electric field is applied to a dielectric body, two dimensional cyclic motion of the dielectric body is generated.

2. The apparatus according to claim 1, wherein the diameter of said dielectric body is of a micrometer-size, and the micrometer-size ranges from several nm to 1000 μm.

3. The apparatus according to claim 2, wherein said micrometer-size ranges from 1 μm to 100 μm.

4. The apparatus according to claim 1, wherein said dielectric body is a substance generating dielectric polarization but not generating a current when an electrostatic field is applied, and is a substance having electrostatic chargeability.

5. The apparatus according to claim 1, wherein said dielectric body is selected from the group consisting of a water droplet, a polymeric substance and a glass bead.

6. The apparatus according to claim 5, wherein said dielectric body is a water droplet, and wherein said water droplet is generated by using a surfactant.

7. The apparatus according to claim 6, wherein said surfactant is generated by using at least one substance selected from the group consisting of dioleoyl phosphatidylcholine (DOPC), dioleoyl phosphatidylethanolamine (DOPE), dioleoyl phosphatidylserine (DOPS), eggPC, stearyl trimethyl ammonium chloride (STAC), stearyl trimethyl ammonium bromide (STAB), sodium dodecyl sulfate (SDS), dodecyl trimethyl ammonium chloride and pentaethylene glycol dodecyl ether.

8. The apparatus according to claim 1, wherein said insulating fluid is a substance that is non-volatile, non-conductive, and fluent under normal temperature and normal pressure, and has a specific gravity with respect to said micrometer-sized dielectric body of within ±50%.

9. The apparatus according to claim 1, wherein said insulating fluid is selected from the group consisting of mineral oil, liquid paraffin, alkane and silicone oil.

10. The apparatus according to claim 1, wherein said electric field is subject to the range from 1 V to 1000 V.

11. The apparatus according to claim 1, wherein a positive electrode and a negative electrode for generating said electric field are arranged so that their central axes are not parallel with each other.

12. The apparatus according to claim 11, wherein said electrode has a pyramid or conical shape having a sharp tip, or a prismatic or cylindrical shape, and has a material having conductivity.

13. The apparatus according to claim 10, wherein said electrode is a conductive substance selected from the group consisting of tungsten, tungsten carbide, gold, platinum, silver, copper, iron and aluminum.

14. The apparatus according to claim 1, wherein the two electrodes comprise a positive electrode and a negative electrode, and the orientation of the two electrodes is such that the two electrodes are in different directions to each other.

15. The apparatus according to claim 14, further comprising a micromanipulator capable of manipulating each of three-dimensional coordinates by 1 μm, the micromanipulator manipulating each coordinate to shift an electrode to a desired position, or further comprising tweezers.

16. The apparatus according to claim 1, further comprising a means for transporting said dielectric body by indirectly controlling the dielectric body by spatial control of said electrodes.

17. The apparatus according to claim 1 for use in mechanical control of a polymer, liquid droplet transportation of a pharmaceutical or chemical, a chemical reaction, pharmaceutical or chemical preparation, non-contact transportation of a biological sample, or a micro-channel.

18. An apparatus for extracting mechanical work, comprising:
an insulating fluid;
a dielectric body arranged in the insulating fluid, the dielectric body being of different composition to the insulating fluid;
two electrodes;

a means for applying a constant voltage between the two electrodes to generate a constant electric field, the two electrodes residing in the insulating fluid, the two electrodes having central axes, the central axes running along the center of their respective electrodes and being parallel to the direction of the maximum length of their respective electrodes, the two electrodes being arranged so that their central axes are sufficiently not aligned such that when the constant electric field is applied to a dielectric body, two dimensional cyclic motion of the dielectric body is generated; and a means for extracting mechanical work from the dielectric body.

19. The apparatus according to claim 18, further comprising a micro-turbine.

20. The apparatus according to claim 18, further comprising a plurality of dielectric bodies including said dielectric body, and the plurality of dielectric bodies are caused to collectively move to function as a motor.

* * * * *